(12) United States Patent
Blanck et al.

(10) Patent No.: US 12,216,892 B2
(45) Date of Patent: Feb. 4, 2025

(54) TECHNIQUES FOR REPLAYING A MOBILE APPLICATION SESSION

(71) Applicant: LogRocket, Inc., Boston, MA (US)

(72) Inventors: Connor Blanck, Somerville, MA (US); James Logsdon, Medford, MA (US); Pascal Kriete, Malden, MA (US)

(73) Assignee: LogRocket, Inc., Boston, MA (US)

( * ) Notice: Subject to any disclaimer, the term of this patent is extended or adjusted under 35 U.S.C. 154(b) by 0 days.

(21) Appl. No.: 18/320,263

(22) Filed: May 19, 2023

(65) Prior Publication Data

US 2024/0264730 A1    Aug. 8, 2024

Related U.S. Application Data

(60) Provisional application No. 63/443,561, filed on Feb. 6, 2023.

(51) Int. Cl.
*G06F 3/04845* (2022.01)
*G06F 3/0488* (2022.01)
*G06F 9/451* (2018.01)

(52) U.S. Cl.
CPC ........ *G06F 3/04845* (2013.01); *G06F 3/0488* (2013.01); *G06F 9/451* (2018.02)

(58) Field of Classification Search
CPC .... G06G 3/04845; G06F 9/451; G06F 3/0488
See application file for complete search history.

(56) References Cited

U.S. PATENT DOCUMENTS

| | | | |
|---|---|---|---|
| 9,747,191 B1 | 8/2017 | Marolia et al. | |
| 9,990,110 B1 * | 6/2018 | Lounibos | G06F 3/0481 |
| 11,966,320 B1 | 4/2024 | Welter et al. | |
| 2007/0240055 A1 * | 10/2007 | Ting | G06F 21/32 715/704 |
| 2012/0317549 A1 | 12/2012 | Cunningham et al. | |
| 2013/0066949 A1 | 3/2013 | Colrain et al. | |
| 2022/0043879 A1 | 2/2022 | Trigalo et al. | |
| 2023/0214240 A1 * | 7/2023 | Parejo | G06F 11/323 715/700 |

OTHER PUBLICATIONS

[No Author Listed], Developer Documentation. SKIA. https://skia.org/docs/dev [last accessed Sep. 14, 2023], 1 page.

(Continued)

*Primary Examiner* — Stacy Khoo
(74) *Attorney, Agent, or Firm* — Wolf, Greenfield & Sacks, P.C.

(57) ABSTRACT

Described herein are techniques for replaying a session of an application executed by a device (e.g., a mobile device). The session may be a session in which a user was interacting with the application. The techniques replay a session by replicating a sequence of visualizations that were rendered in an application GUI by the device in a replay GUI displayed on another device. The techniques replicate visualizations by: (1) accessing data associated with the visualizations from the device executing the application; and (2) replicating the visualizations in the replay GUI to provide a replay. A user of the other device viewing the replay GUI will see a replay of the visualizations rendered in the application GUI in the session.

20 Claims, 13 Drawing Sheets

(56) References Cited

OTHER PUBLICATIONS

[No Author Listed], User Documentation. SKIA. https://skia.org/docs/user/ [last accessed Sep. 14, 2023], 1 page.
U.S. Appl. No. 18/320,273, filed May 19, 2023, Bruder Welter et al.
International Search Report and Written Opinion mailed Apr. 5, 2024 for International Application No. PCT/US2024/013930.

* cited by examiner

TECHNIQUES FOR REPLAYING A MOBILE APPLICATION SESSION

RELATED APPLICATIONS

This application claims priority under 35 U.S.C. § 119(e) to U.S. Provisional Application Ser. No. 63/443,561, titled "TECHNIQUES FOR REPLAYING A MOBILE APPLICATION SESSION," filed on Feb. 6, 2023, which is herein incorporated by reference in its entirety.

FIELD

Aspects of the present disclosure relate to techniques for replaying a session of an application executed by a device (e.g., a mobile device) on another device. In particular, the techniques can capture a sequence of visualizations that occurred and/or were rendered in an application GUI during the session, and replay the captured sequence of visualizations in a (different) replay GUI that is displayed on the other device.

BACKGROUND

A software application may be used by a large number of users (e.g., thousands of users). For example, the software application may be a mobile application accessed using a mobile device (e.g., a smartphone). The mobile application may be accessed hundreds or thousands of times daily by users through various sessions. Users may interact with the mobile application through a graphical user interface (GUI) of the mobile application presented on mobile devices.

SUMMARY

Described herein are techniques for replaying a session of an application executed by a device (e.g., a mobile device). The session may be a session in which a user was interacting with the application. The techniques replay a session by replicating a sequence of visualizations that were rendered in an application GUI by the device in a replay GUI that is displayed on another device. The techniques can replicate visualizations by: (1) accessing data associated with the visualizations from the device executing the application; and (2) replicating the visualizations in the replay GUI. A user of the other device viewing the replay GUI will see a replay of the visualizations rendered in the application GUI in the session. As a result, the techniques can provide for visually replaying back a user's interactions with a GUI at a later point in time.

Some embodiments provide a method of replaying a sequence of visualizations rendered in a graphical user interface (GUI) of a mobile application executed by a mobile device on a display of a computing device different from the mobile device. The method comprises: using a processor to perform: accessing data associated with the sequence of visualizations obtained from the mobile device during a session in which the sequence of visualizations was being rendered in the mobile application GUI; providing, to the computing device, a replay GUI separate from the mobile application GUI; and replicating, using the data associated with the sequence of visualizations, the sequence of visualizations in the replay GUI to provide a replay of the sequence of visualizations rendered in the mobile application GUI, the replicating comprising: determining, using data associated with at least one visualization of the sequence of visualizations, at least one operation that, when executed by the computing device, causes the computing device to replicate the at least one visualization in the replay GUI; and transmitting, to the computing device, the at least one operation for execution by the computing device.

Some embodiments provide a system for replaying a sequence of visualizations rendered in a graphical user interface (GUI) of a mobile application executed by a mobile device on a display of a computing device different from the mobile device. The system comprises a processor and a non-transitory computer-readable storage medium storing instructions. The instructions, when executed by the processor cause the processor to: access data associated with the sequence of visualizations obtained from the mobile device during a session in which the sequence of visualizations was being rendered in the mobile application GUI; provide, to the computing device, a replay GUI separate from the mobile application GUI; and replicate, using the data associated with the sequence of visualizations, the sequence of visualizations in the replay GUI to provide a replay of the sequence of visualizations rendered in the mobile application GUI, the replicating comprising: determining, using data associated with at least one visualization of the sequence of visualizations, at least one operation that, when executed by the computing device, causes the computing device to replicate the at least one visualization in the replay GUI; and transmitting, to the computing device, the at least one operation for execution by the computing device.

Some embodiments provide a non-transitory computer-readable storage medium storing instructions. The instructions, when executed by a processor, cause the processor to perform a method of replaying a sequence of visualizations rendered in a graphical user interface (GUI) of a mobile application executed by a mobile device on a display of a computing device different from the mobile device. The method comprises: accessing data associated with the sequence of visualizations obtained from the mobile device during a session in which the sequence of visualizations was being rendered in the mobile application GUI; providing, to the computing device, a replay GUI separate from the mobile application GUI; and replicating, using the data associated with the sequence of visualizations, the sequence of visualizations in the replay GUI to provide a replay of the sequence of visualizations rendered in the mobile application GUI, the replicating comprising: determining, using data associated with at least one visualization of the sequence of visualizations, at least one operation that, when executed by the computing device, causes the computing device to replicate the at least one visualization in the replay GUI; and transmitting, to the computing device, the at least one operation for execution by the computing device.

Some embodiments provide a device for replaying a sequence of visualizations rendered in a graphical user interface (GUI) of a mobile application executed by a mobile device separate from the device. The device comprises: a display; a processor; and a non-transitory computer-readable storage medium storing instructions that, when executed by the processor, cause the processor to: display a replay GUI in the display of the device; receive, from a system separate from the device, a set of operations, the set of operations determined using data associated with the sequence of visualizations and obtained from the mobile device; and execute the set of operations, wherein execution of the set of operations causes the processor to replicate the sequence of visualizations in the replay GUI shown in the display of the device.

In some embodiments, the set of operations comprise a set of drawing operations that cause the processor to render replications of the sequence of visualizations in the replay GUI.

In some embodiments, the instructions, when executed by the processor, cause the processor to: generate the replay GUI using a software class representing the GUI, wherein the software class is different from one or more software classes used by the mobile device to render the sequence of visualizations; wherein executing the set of operations comprises executing the set of operations using the software class. In some embodiments, the software class is a canvas class of a Skia software library. In some embodiments, the mobile device rendered the sequence of visualizations in the mobile application GUI using an iOS operating system and execution of the set of operations comprises executing the set of operations without using the iOS operating system.

In some embodiments, execution of the set of operations causes the processor to place, in the replay GUI, at least one image of at least one of the sequence of visualizations to replicate the at least one visualization. In some embodiments, the set of operations includes at least one operation that was executed by the mobile device to render at least one of the sequence of visualizations.

There has thus been outlined, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
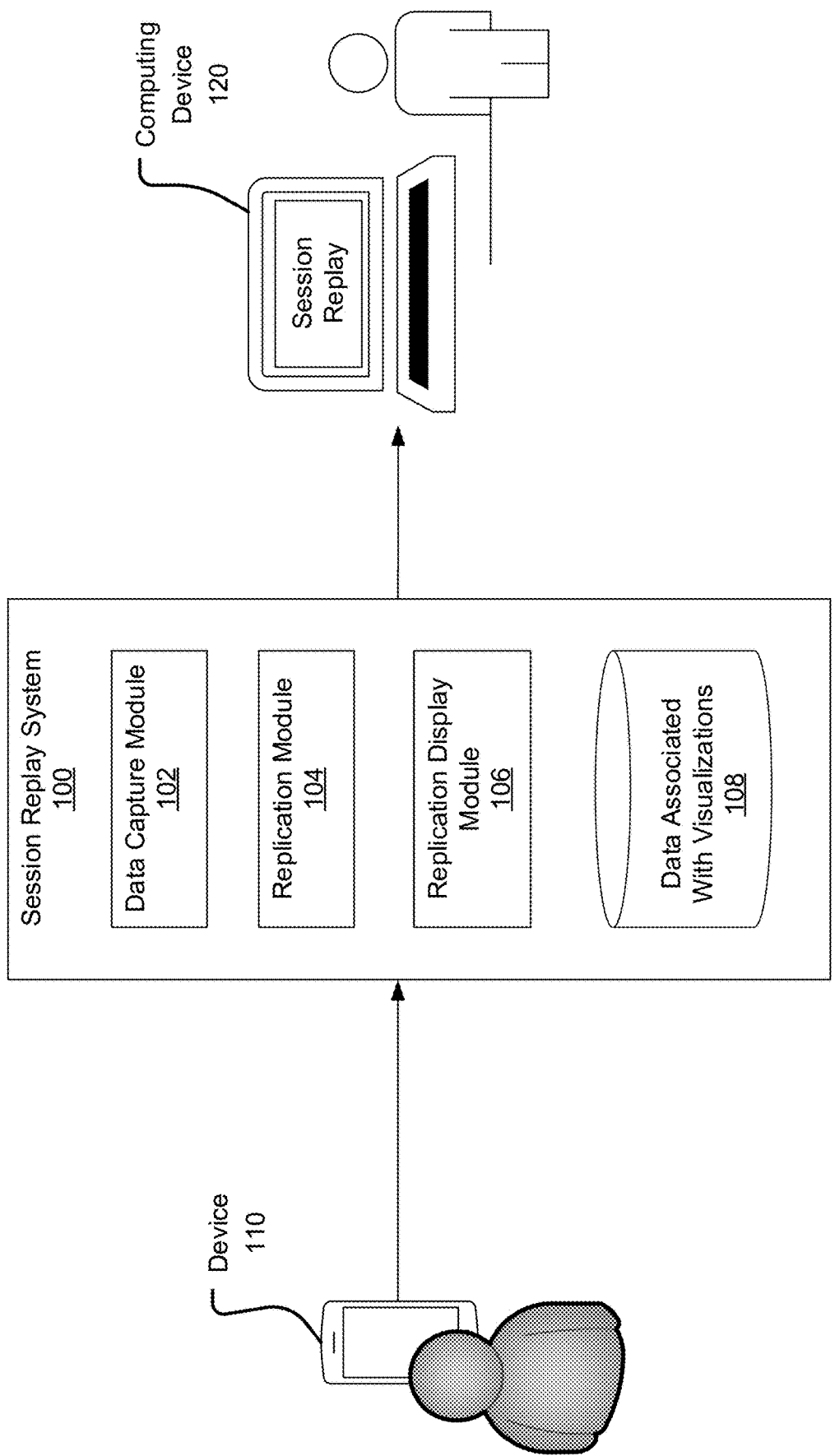
FIG. 1A is a diagram of session replay system, according to some embodiments of the technology described herein.

Described herein are techniques for capturing a sequence of interactions with a graphical user interface (GUI) of a mobile application, and (visually) replaying the interactions at a later point in time. The interactions can include visualizations rendered in, or otherwise associated with, a GUI executed by a mobile device. The interactions can be stored and visually played back on a display of a computing device that is different from the mobile device. The sequence of visualizations may be associated with user interactions with the mobile application through the GUI. For example, the techniques may be used to replay, on an Internet website, a sequence of visualizations rendered in a GUI of a mobile application during a session in which a user was interacting with the mobile.

In order to diagnose an issue that occurred in an application session (e.g., of a mobile application), it may be helpful to view the sequence of events in the session leading up to and/or after the occurrence of the issue. For example, a software developer, technical support expert, product manager, or other user may need to diagnose a cause of an application error that occurred during a session of the application. Viewing the sequence of events leading up to and/or after the occurrence of the application error in the session may facilitate diagnosing a cause of the application error. For example, viewing the sequence of events may reveal certain actions performed by a user, a state of the mobile application prior to and/or after the occurrence of the issue, a failure to respond to a request in the mobile application, a nonoperational graphical element in a GUI of the mobile application, and/or other information. The information may be used to identify and/or resolve the issue in the application.

Typically, a sequence of visualizations is rendered in, or otherwise associated with, a GUI of a mobile application during a session. The sequence of visualizations may be associated with user interactions with the mobile application through the GUI during the session. For example, in a mobile application being executed by a smartphone with a touch screen, a user may select graphical elements (e.g., by tapping locations on a screen), drag graphical elements across a screen, type in values using a keyboard application, provide image data using a camera of a device, and/or interact with the mobile application in other ways. Replaying a sequence of visualizations rendered in a mobile application GUI may allow a user to visualize a sequence of events in a session (e.g., to diagnose an issue that occurred in the session). The replay may be displayed on other devices (e.g., through an Internet website) to allow users to view the sequence of visualizations. For example, software developers, technical support experts, and/or product managers may view the replay to identify issues in the software application.

The inventors have recognized that a challenge in replaying a sequence of visualizations rendered in an application GUI is that different devices may render visualizations in different manners. Accordingly, it can be challenging to adequately capture and/or replay the sequence of visualizations (or information associated with the sequence of visualizations), which can result in a replay system being unable to capture and/or perform certain rendering operations executed by the mobile device. As an illustrative example, the replay system may not have access to resources that were used by a mobile application to render the visualizations. For example, the replay system may not have access to certain software constructs (e.g., software classes and/or instances thereof), software libraries, and/or hardware of the device. To further illustrate this point, a mobile device may use a particular operating system that provides various software classes that a mobile application executing on the mobile device can use to render visualizations. A replay system may use a different operating system and may be unable to use the software classes provided by the operating system of the mobile device to render or replay those visualizations. For example, Apple Inc.'s iOS operating system provides view and view controller classes that can be used by an iOS application to render content in a GUI of the iOS application. If the iOS content is captured for replay by capturing information of those view and view controller classes, a replay system that does not use iOS may be unable to use those classes to render visualizations.

To address the above-described challenges with capturing and replaying a sequence of visualizations rendered in an application GUI, the inventors have developed techniques for generating a replay of an application session by replicating a sequence of visualizations rendered in an application GUI on another computing device. The techniques provide for capturing visual aspects associated with a user's interaction with the GUI. The techniques provide a replay GUI that is used to replicate the sequence of visualizations on another computing device. A user viewing replicated visualizations in the replay GUI may thus effectively see a replay of a session of the application from the perspective of the original user. For example, the techniques may replicate a sequence of visualizations from a mobile application GUI in a replay GUI displayed on an Internet website that can be accessed using an Internet browser application. As described herein, a replay system includes techniques for both capturing the original sequence of interactions and visualizations of the application GUI and for playing back those captured interactions and visualizations.

The techniques allow a replay system to generate replays of application sessions from various types of applications that used different resources to render visualizations. For example, the techniques may allow replication of a visualization rendered in an iOS mobile application in a replay system that does not use the iOS operating system. Continuing with the previous example, the iOS mobile application may use certain software classes (e.g., a view and/or view controller class) provided by the iOS operating system to render visualizations in a GUI of the mobile application. The techniques described herein provide a replay system that does not rely on having access to those software classes to replicate visualizations rendered in the GUI of the mobile application.

To replay rendered visualizations from an application on a device, the techniques described herein use data associated with the rendered visualizations to determine operations that, when executed, cause a replay system to replicate the visualizations in a replay GUI. Some embodiments may use the data to determine changes in visual attributes of a graphical element that occurred as part of a visualization, and determine a set of operations that can be executed to replicate those changes in the replay GUI. The set of operations may be operations that can be performed using resources available to the replay system. For example, the set of operations may be operations that can be executed using software classes and/or libraries available to the replay system. Accordingly, the techniques do not rely on device-specific resources (e.g., software classes and/or libraries) used by the application to generate a replay of a session. As a result, the application can be executed using one operating system, and replayed using a different operating system. For example, the techniques may allow a replay system to replicate visualizations rendered in an iOS application in a replay GUI without using software classes that are available only to devices that use the iOS operating system.

Some embodiments provide techniques for replaying a sequence of visualizations rendered in a GUI of a mobile application executed by a mobile device on a display of a computing device that is different from the mobile device. For example, the techniques may replay a sequence of visualizations rendered in the mobile application GUI on a website displayed in an Internet browser application being executed by the computing device. The techniques access data associated with the sequence of visualizations obtained from the mobile device during a session in which the sequence of visualizations was being rendered in the mobile application GUI. For example, the data may have been captured in the session while a user was interacting with the mobile application GUI. The techniques further provide a replay GUI to another device (e.g., in an Internet webpage that can be accessed by the other device using an Internet browser application). The techniques use the data associated with the sequence of visualizations to replicate the sequence of visualizations in the replay GUI. Some embodiments may replicate one or more visualizations in the sequence by determining, using data associated with the visualization(s), one or more operations that, when executed, result in replication of the visualization(s) in the replay GUI. The operation(s) may then be executed in order to provide a replay of the visualization(s) in the replay GUI. A user (e.g., a software developer, technical support expert, and/or product manager) may view the replay GUI (e.g., using an Internet browser application of the computing device) while the sequence of visualizations is being replicated therein. This may provide the user with a replay of the sequence of visualizations originally rendered in the mobile application GUI.

The techniques described herein may be implemented in any of numerous ways, as the techniques are not limited to any particular manner of implementation. Examples of details of implementation are provided herein solely for illustrative purposes. The techniques disclosed herein may be used individually or in any suitable combination as aspects of the technology described herein are not limited to the use of any particular technique or combination of techniques. Furthermore, although some embodiments are described herein in the context of replaying a sequence of visualizations from a mobile application GUI, some embodiments are not limited to such a context. Such a context is used for illustration purposes and some embodiments are not limited in this respect. For example, some embodiments can be used for replicating a sequence of visualizations rendered in a desktop application, or in a web application displayed by an Internet browser application.

FIG. 1A is a diagram of session replay system 100, according to some embodiments of the technology described herein. At a high level, the session replay system 100 captures and generates a replay of visualizations rendered in a GUI of an application executed by the device 110 in a display of computing device 120. In the example embodiment of FIG. 1A, the computing device 120 is different from the device 110. Device 120 may be used by a user to view a replay of a session of the application. For example, the user may be a software developer, technical support expert, and/or product manager that may view the replay of the application session to diagnose an issue (e.g., application error, network connection, failed request, and/or other issue) that occurred during the session.

In some embodiments, the device 110 may be a mobile device. For example, the device 110 may be a smartphone, a tablet, a smartwatch, an e-reader, a handheld gaming console, or another mobile device. In such embodiments, the application for which the session replay system 100 generates a replay may be a mobile application executed by the device 110. For example, the mobile application executed by the device 110 may be an iOS application.

Although the example of FIG. 1A shows a single device 110, in some embodiments, the session replay system 100 may communicate with multiple different devices (indeed, hundreds or thousands of devices, as discussed herein) to replay application sessions from the multiple devices. Further, the session replay system 100 may generate replays for multiple different applications. Techniques are described herein with respect to a single device 110 and application for illustrative purposes. However, embodiments of the session replay system 100 are not limited to generating replays for a single device or application.

The session replay system 100 includes a data capture module 102, a replication module 104, a replication display module 106, and a datastore 108 storing data associated with visualizations rendered in the GUI of the application executed by the device 110. In some embodiments, the session replay system 100 may comprise one or more servers for implementing modules of the system 100 and/or components thereof. In some embodiments, one or more modules of the mobile replay system 100 and/or components thereof may be executed by the device 110 and/or the computing device 120.

The data capture module 102 may obtain data from the device 110 during a session of an application (e.g., a mobile application) being executed by the device 110. An application session may be a time period in which a user is interacting with the application (e.g., through a GUI displayed by the device 110). The session may be represented as a sequence of events representing the time period. The session may be delimited by certain events. For example, the start of the session may be when the application is launched or otherwise used after a period of nonuse (e.g., 15 minutes, 30 minutes, 1 hour, 2 hours, or other suitable time period). As another example, the end of the session when the application is closed or after a threshold time period (e.g., 15 minutes, 30 minutes, 1 hour, 2 hours, or another suitable time period).

In some embodiments, the data capture module 102 may be executed on device 110. For example, the data capture module 102 may be executed as a component of the application. The component of the application may obtain application data and transmit the data for storage in the datastore 108 of the session replay system 100. In some embodiments, the data capture module 102 may be executed separately from device 110. For example, the data capture module 102 may be executed by one or more servers of the session replay system 100. In such embodiments, the data capture module 102 may communicate with the application to obtain data.

In some embodiments, the data capture module 102 may obtain data from the device 110 associated with visualizations rendered in an application GUI during a session. The data capture module 102 may access values from software objects used by the application. For example, the data capture module 102 may obtain value(s) of one or more attributes from an instance of a software class in the application. The attribute value(s) may indicate visual characteristic(s) (e.g., color, shape, dimensions, rotation, font, font size, font formatting, and/or image) of graphical elements in the application GUI. For example, a software object (e.g., an instance of a software class) may represent the application GUI and/or a graphical element therein. The data capture module 102 may access attribute value(s) and changes therein from the software object and transmit the values for storage in the datastore 108. In some embodiments, the data capture module 102 may detect a change in an attribute value of a software object and capture data indicating the change (e.g., by obtaining attribute values before and after the change). For example, the data capture module 102 may detect a change by monitoring the software object for the execution of one or more methods that result in attribute changes that cause the rendering of a visualization in the application GUI. As another example, the software object may provide an indication of updates. The data capture module 102 may obtain data from the indications of updates provided by the software object.

In some embodiments, the application may be an iOS application that uses a view class (e.g., UIView, UIStackView, UIScrollView, UIImage View, UIProgress View, UICalendarView, etc.) and/or a view controller class (e.g., UIControl, UIButton, UIColorWell, UIDatePicker, UIPageControl, etc.) to render a visualization in a GUI of the application. The data capture module 102 may access attribute value(s) from a view class and/or a view controller class. The view and/or view controller class may provide functions to access variable values that are determinative of visualizations in the application GUI. In some embodiments, the data capture module 102 may detect when there is a change in a particular attribute, and obtain values of the particular variable before and after the change. In some embodiments, a data capture module 102 may monitor a class to detect changes in attribute values. For example, the data capture module 102 may monitor the class to detect changes by determining whether certain function(s) of the class have been executed to update attribute value(s).

In some embodiments, the data capture module 102 may obtain one or more images of a portion of an application GUI. The data capture module 102 may identify a location of an area of interest in the application GUI (e.g., an area including a graphical element that is updated as part of rendering a visualization in the application GUI). For example, the data capture module 102 may identify the coordinates of a boundary of the area of interest. In some embodiments, the data capture module 102 may identify the location of a graphical element by obtaining information from a software object (e.g., an instance of a software class) indicating location information (e.g., coordinates) of a boundary of the graphical element. The data capture module 102 may then obtain an image of a portion of the application GUI using the location information. For example, the data capture module 102 may take a screen capture of the portion of the application GUI using the location information (e.g., by clipping to coordinates of a boundary of a graphical element).

Examples of data associated with a visualization rendered in an application GUI include data indicating the location (e.g., coordinates) of a user touch interaction, image information, text information (e.g., color, font, size, etc.), color information, shadow information, line thickness information, tint information, position information, visibility information, opacity information, shape information, and/or other information. It should be appreciated that example data mentioned herein is for illustrative purposes. In some embodiments, the data capture module 102 may obtain data in addition to or instead of examples described herein.

In some embodiments, the data capture module 102 may obtain data indicative of one or more operations performed by the device 110 in order to render one or more visualizations in an application GUI. The operation(s) may then be executed by the replication module 104. To illustrate, the application may use an application program interface (API) to render visualizations in an application GUI. For example, the application may be an ANDROID application that uses the canvas API to render visualizations in the application GUI (e.g., to draw shapes for the application GUI). The application may execute various methods (e.g., draw Arc, draw Bitmap, drawCircle, drawLine(s), drawOval, drawPaint, drawPicture, drawText, drawBitmapMesh, etc.) provided by the API in order to render visualizations. The data capture module 102 may obtain data indicating the executed methods (e.g., for use by the replication module 104 in replicating operations performed by the device 110).

The replication module 104 may use data obtained from the device 110 by the data capture module 102 in order to replicate the visualizations rendered in an application GUI by the device 110. obtained by the data capture module 102 may be stored in the datastore 108 of the session replay system 100. The replication module 104 may access the data from the datastore 108 to replicate the visualizations rendered in the application GUI.

In some embodiments, the replication module 104 may not use an operation system of the device 110. For example, the device 110 may use an iOS operating system. As such, an application executed by the device 110 may use software constructs (e.g., software classes) provided by the iOS system. The replication module 104 may not have access to these software constructs. The replication module 104 may replicate the visualizations using entirely different software constructs than those used by the application. For example, the replication module 104 may use a different software library to replicate visualizations than one used by the application. The software library may include different software classes than those used by the application (e.g., iOS provided software classes). As another example, the replication module 104 may replicate the visualizations rendered in an application GUI using a different operating system than one used by the application.

In some embodiments, the replication module 104 may replicate visualizations rendered in the application GUI by replicating the visualizations in a replay GUI. The replay GUI may represent the application GUI. A sequence of visualizations rendered in the application GUI may be replicated in the replay GUI to provide a replay of the sequence of visualizations to a user viewing the replay GUI. In some embodiments, the replay GUI may be a GUI of an Internet website that can be accessed by the device 120 using an Internet browser application.

In some embodiments, the replication module 104 may add visualizations as part of a sequence of replicated visualizations. The added visualizations may facilitate a viewing of a replay. In some embodiments, an added visualization may indicate a user action performed in the GUI. For example, the replication module 104 may add in visualizations that show a user selected a particular graphical element (e.g., a button). The replication module 104 may add a visualization that animates selection of the graphical element in the replay GUI. This may allow a user to recognize that a subsequent visualization occurred in response to selection of the graphical element.

In some embodiments, the replication module 104 may use a software object (e.g., an instance of a software class) representing a display of the device 110 to replicate visualizations in a replay GUI. The replication module 104 may render visualizations in the replay GUI using functions provided by the software object. The replication module 104 may use the software object to perform various drawing operations to render visualizations in the GUI of the replay application that replicate the visualizations rendered in the application GUI. In some embodiments, the software object may be one provided by the Skia graphics library.

In some embodiments, the replay application may use a canvas software class instance provided by the Skia graphics library as a representation of a screen of the device 110. The replay application may use the canvas instance to execute drawing operations that render visualizations in the replay GUI. The Canvas class may provide various drawing operations that can be performed to render visualizations in the replay GUI. For example, the replication module 104 may render visualizations by executing operations that result in drawing shapes, drawing curves, translating and/or rotating shapes, rendering text, shading, and/or generation of other visualizations in the replay GUI. Example visualizations described herein are for illustration of embodiments. Some embodiments may render visualizations instead of and/or in addition to example visualizations described herein.

In some embodiments, the replication module 104 may replicate a visualization rendered in an application GUI by determining one or more operations that replicate the visualization. The operation(s), when executed by a processor (e.g., of the session replay system 100 and/or the device 120), result in replicating the visualization in a replay GUI. The replication module 104 may use data captured by the data capture module 102 to determine the operation(s). In some embodiments, the replication module 104 may use data associated with the visualization rendered in the application GUI to determine a set of drawing operations that can be executed to replicate the visualization. For example, the replication module 104 may determine a set of drawing operations available through an instance of a canvas class that, when executed, replicates the visualization in the replay GUI. The replication module 104 may execute the set of operations to replicate the visualization. As an illustrative example, a visualization rendered in an application GUI may be a change in position of a shape displayed in the application GUI. The replication module 104 may: (1) access data indicating the change in the shape's position in the application GUI; (2) determine, using the data, a set of drawing operations to change the position of the shape in the replay GUI; and (3) execute the set of drawing operations to change the position of the shape in the replay GUI.

As described herein, in some embodiments, a visualization rendered in an application GUI may have been rendered using software constructs not available to the replication module 104 (e.g., because the visualization was rendered using a different operating system). The replication module 104 may thus translate visualizations rendered in the application GUI into operations that can be executed by the replay application. The replication module 104 may: (1) determine a change in a graphical element in the application GUI using data collected by the data capture module 102 (e.g., during a session in which the visualization was rendered); and (2) determine a set of drawing operations that can be executed by the replication module 104 (e.g., using software constructs available to the replay application) to render the change in the graphical element in a replication application GUI. The set of drawing operations determined by the replication module 104 may be different from those executed by the device 110 because they utilize an entirely different set of software constructs (e.g., a different operating system and/or a different software framework) for rendering visualizations.

In some embodiments, a visualization rendered in an application GUI may have been rendered using software constructs that are available to the replication module 104. For example, the visualizations may have been rendered using an instance of a canvas class in ANDROID. The replication module 104 may use a software library (e.g., Skia) that provides access to the canvas class. The replication module 104 may replicate visualizations rendered in the application GUI by: (1) identifying a set of drawing operations performed by the device 110 to render the visualization; and (2) executing the same set of drawing operations to replicate visualizations in a replay GUI. The replication module 104 may thus execute the same operations that were executed by the application of device 110 to render the visualization in the replay GUI.

In some embodiments, the replication module 104 may replicate a visualization rendered in an application GUI by: (1) obtaining one or more images of a visualization; and (2) replicating the visualization by placing the image(s) in a replication application GUI. The replication module 104 may determine a location in the replication application GUI at which the place the image(s). In some embodiments, the replication module 104 may determine coordinates representing a portion of a screen at which to position the image(s). For example, the application GUI may include a graphical element represented by an iOS view class instance. The view class instance may provide coordinates of a boundary of the graphical element that are obtained by the data capture module 102. The replication module 104 may use the boundary coordinates to place, in a replay GUI, an image of the graphical element captured by the data capture module 102.

In some embodiments, location information obtained from the device 110 (e.g., by the data capture module 102) may be in a different coordinate frame than one used by the replication module 104. For example, coordinates of a touch interaction in an application GUI obtained from the device 110 may be provided in a coordinate frame of a screen of the device 110. The replication module 104 may use a coordinate frame of the application GUI, which may be different than the screen coordinate frame. For example, a 200×200 pixel screen may have a 600×600 scaled representation in a replay GUI. The replication module 104 may transform location information (e.g., coordinates) to the coordinate frame of the replication module 104 (e.g., which is the coordinate frame of the application GUI). The replication module 104 may transform the location information by: (1) determining a scaling ratio between the two coordinate frames; and (2) applying the scaling ratio to the location information to obtain the transformed location information. For example, the replication module 104 may use the scaling ratio to transform coordinates from a coordinate frame of the mobile device's 110 screen to coordinates of the replay GUI.

In some embodiments, the replication module 104 may determine a scaling ratio by obtaining the scaling ratio from the device 110. For example, the operating system (e.g., iOS) of the device 110 may provide a scaling ratio between a coordinate frame of the application GUI and the coordinate frame of the screen of the device 110. A replay GUI may use the same coordinate frame as the application GUI, and thus the replication module 104 may use the scaling ratio provided by the operating system. In some embodiments, the replication module 104 may determine the scaling ratio by: (1) determining a size of a screen of the device 110; (2) determining a size of a coordinate frame of a replay GUI in which visualizations are replicated; and (3) determining the scaling ratio using the screen size and the size of the coordinate frame of the replay GUI.

In some embodiments, component(s) of the replication module 104 may be executed by the computing device 120. The computing device 120 may execute operation(s) determined to replicate visualizations in a replay GUI (e.g., by rendering replicated visualizations in the replay GUI). For example, the replication module 104 may include a replay application executed on the computing device 120. Operations determined by the replication module 104 may be executed within the replay application. In some embodiments, component(s) of the replication module 104 may be executed separately from the computing device 120. For example, the determination of operation(s) for replicating visualizations in a replay GUI may be performed by server (s) of the session replay system 100.

The replication display module 106 may provide replay GUI on a display of the computing device 120. In some embodiments, the replication display module 106 may display the replay GUI in the display of the device 120 while a sequence of visualizations is being replicated in the GUI. A user of the device 120 viewing the display of the replay GUI generated by the replication display module 106 may view replication of a sequence of visualizations rendered in a GUI of an application executed by the device 110. Accordingly, the user may be able to view a replay of an application session.

In some embodiments, the replication display module 106 may generate a webpage of an Internet website and display a replay GUI in the webpage. For example, the webpage may be accessible by the device 120 using an Internet browser application. In some embodiments, the replication display module 106 may provide the replay GUI through an application executed by the device 120. For example, the application may be installed on the device 120. The replication display module 106 may display the replay GUI as part of an interface of the application.

In some embodiments, the replay GUI may provide a control interface that allows a user to navigate a sequence of replications replicated in the replay GUI. For example, the replication display module 106 may provide a play option, a forward option, a rewind option, and/or a draggable element that controls a position in a sequence of replicated visualizations. An example such an interface is described herein with reference to FIGS. 5B-5D.

The datastore 108 may store data associated with visualizations rendered in a GUI of an application executed by the device 110. The datastore 108 may store data captured by the data capture module 102. In some embodiments, the datastore 108 may store attribute values of graphical elements from the application GUI obtained by the data capture module 102. In some embodiments, the data store 108 may store data indicating operations performed by the device 110 to render visualizations in the application GUI obtained by the data capture module 102. In some embodiments, the data store 108 may store images of the application GUI obtained by the data capture module 102.

In some embodiments, the datastore 108 may store records associated with respective sessions of an application executed by the device 110. Each record may store data for replicating a sequence of visualizations rendered in the application during a respective session. The record may be accessed by the session replay system 100 in order to replay a session (e.g., by replicating visualizations rendered from the session in a replay GUI displayed by the device 120). For example, in response to a request from the device 120 to view a replay of a session of an application executed by the device 110, the session replay system 100 may provide a record associated with the session to the device 120 to allow the device 120 to execute operations to replicate a sequence of visualizations rendered in an application GUI during the session (e.g., using an Internet browser application of the device 120). As another example, in response to a request from the device 120 to view a replay of a session of an application executed by the device 110, the session replay system 100 may access a record associated with the session and replicate a sequence of visualizations from an application GUI in a replay GUI provided to the device 120.

In some embodiments, the datastore 108 may comprise storage hardware. For example, the datastore 108 may comprise of one or more hard disk drives, solid-state drives, and/or other storage hardware. In some embodiments, the datastore 108 may comprise cloud-based storage. The cloud-based storage may comprise storage hardware in one or more locations remote from other module(s) of the session replay system 100. The storage hardware may be accessed through a network (e.g., the Internet). Some embodiments may use other forms of storage in addition to and/or instead of those described herein as the storage 108 of the session replay system 100.

The computing device 120 may be any suitable computing device. For example, the computing device 120 may be a desktop computer, or a mobile device. In some embodiments, the device 120 may be any device that can execute an Internet browser application (e.g., to access a website in which application session replays are displayed).

Figure 1B:
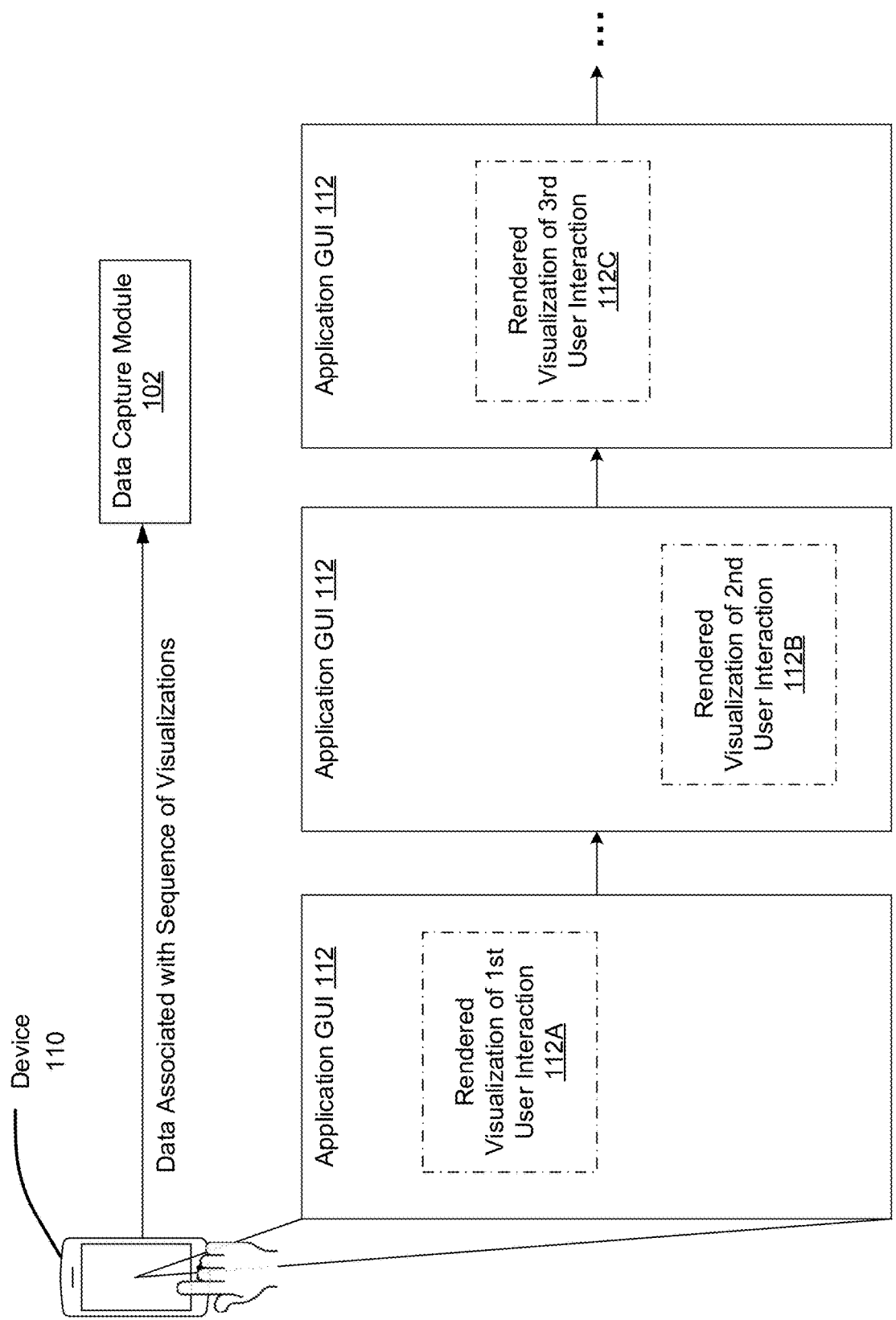
FIG. 1B is a diagram illustrating capture of data associated with a sequence of visualizations rendered in an application GUI, according to some embodiments of the technology described herein.

FIG. 1B is a diagram illustrating capture of data associated with a sequence of visualizations rendered in a GUI 112 of an application executed by the device 110, according to some embodiments of the technology described herein. The sequence of visualizations may be rendered during a session in which a user is interacting with the application through the GUI.

In the example of FIG. 1B, a user is using the application GUI 112 to interact with the application. For example, the device 110 may be a smartphone in which a user is interacting with the application GUI 112 with touch interactions (e.g., tap, drag, pinch, etc.) on a touch screen. A sequence of user interactions may result in a sequence of visualizations 112A, 112B, 112C rendered in the application GUI during a session. For example, the sequence of visualizations may include changes to graphical elements displayed in the application GUI such as changes in color, text, shape, dimensions, orientation and/or other changes.

As shown in FIG. 1B, the data capture module 102 of the session replay system obtains data associated with the sequence of visualizations 112A, 112B, 112C rendered in the application GUI 112. Example techniques of obtaining data associated with visualizations are described herein with reference to FIG. 1A.

In some embodiments, the data capture module 102 may capture the data associated with the sequence of visualizations 112A, 112B, 112C as the visualizations are being rendered. For example, the data capture module 102 may be executed as part of the application. The data capture module 102 may obtain data associated with the visualizations and transmit the data for storage in the datastore 108 of the session replay system 100 (e.g., for use in replicating the sequence of visualizations by the replication module 104). As another example, the data capture module 102 may be executed as a separate application on the device 110 that captures the data associated with the sequence of visualizations from the application. In some embodiments, the data capture module 102 may store the data associated with the sequence of visualizations 112A, 112B, 112C in a record associated with a session in which the sequence of visualizations 112A, 112B, 112C was rendered. The record may subsequently be accessed by the replication module 104 of the session replay system 100

Figure 1C:
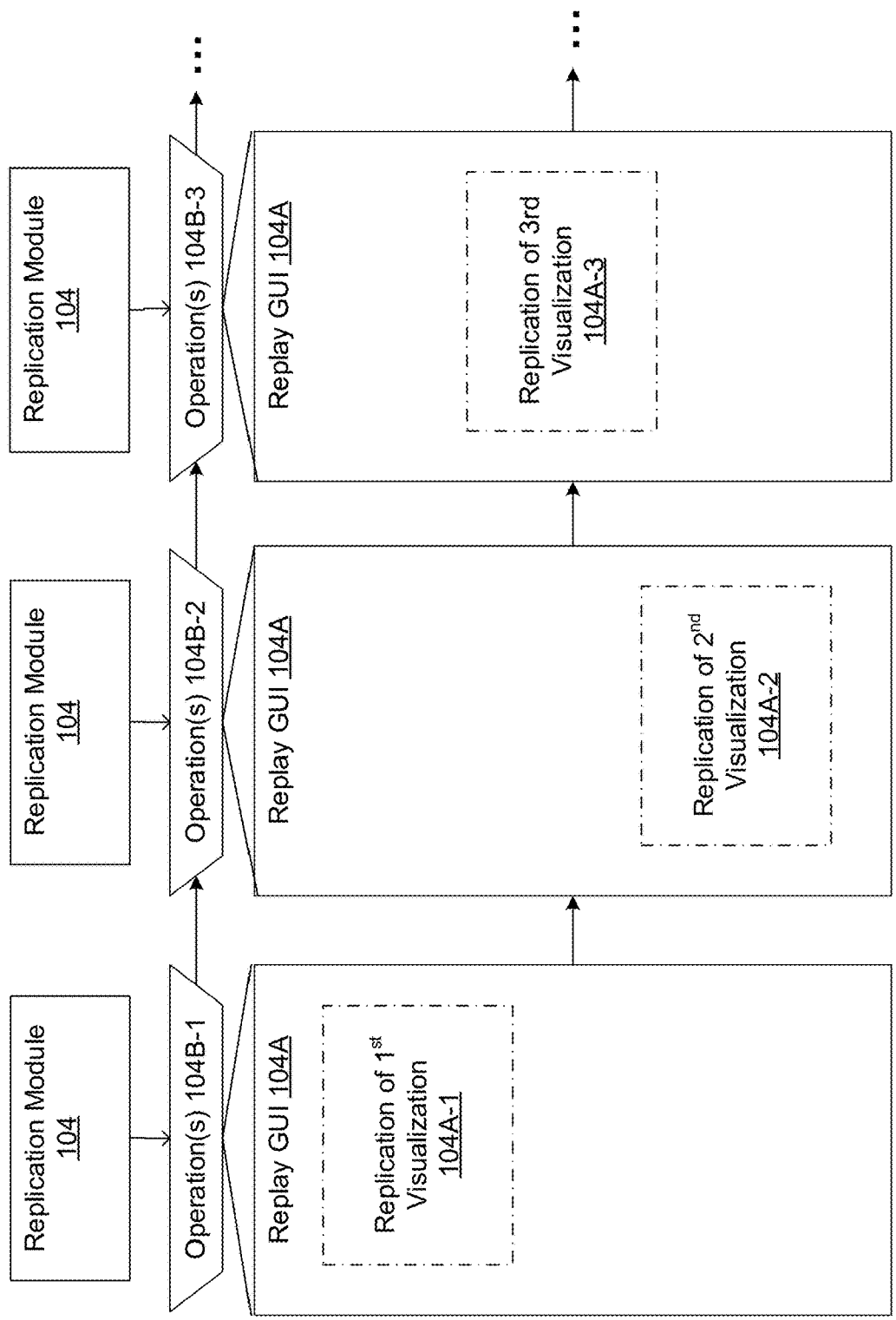
FIG. 1C is a diagram illustrating replication of the sequence of visualizations of FIG. 1B, according to some embodiments of the technology described herein.

FIG. 1C is a diagram illustrating replication of the sequence of visualizations 112A, 112B, 112C rendered in the application GUI 112 of FIG. 1B, according to some embodiments of the technology described herein. The replication module 104 may use the data associated with the sequence of visualizations 112A, 112B, 112C captured by the data capture module 102 to replicate the sequence of visualizations 112A, 112B, 112C in a replay GUI.

As shown in FIG. 1C, the replication module 104 executes a sequence of sets of operations 104B-1, 104B-2, 104B-3. Each set of operations may be determined and performed by the replication module 104 to replicate a respective one of the sequence of visualizations 112A, 112B, 112C in the replay GUI 104A. In the example of FIG. 1C, the set of operations 104B-1 is executed by the replication module 104 to generate a replication 104A-1 of the first visualization 112A, the set of operations 104B-2 is executed by the replication module 104 to generate a replication of 104A-2 of the second visualization 112B, and the set of operations 104B-3 is executed by the replication module 104 to generate a replication 104A-3 of the third visualization 112C.

Example operations that may be determined and executed by the replication module 104 are described herein with reference to FIG. 1A. For example, a set of operations may include one or more drawings operations determined by the replication module 104 to replicate a visualization rendered in the application GUI 112. As another example, a set of operations may include one or more operations that were executed by the device 110 to render a respective visualization which the replication module 104 may now execute to replicate the visualization. As another example, a set of operations may include positioning, in the replay GUI 104A, one or more images of a visualization captured by the data capture module 102.

Figure 1D:
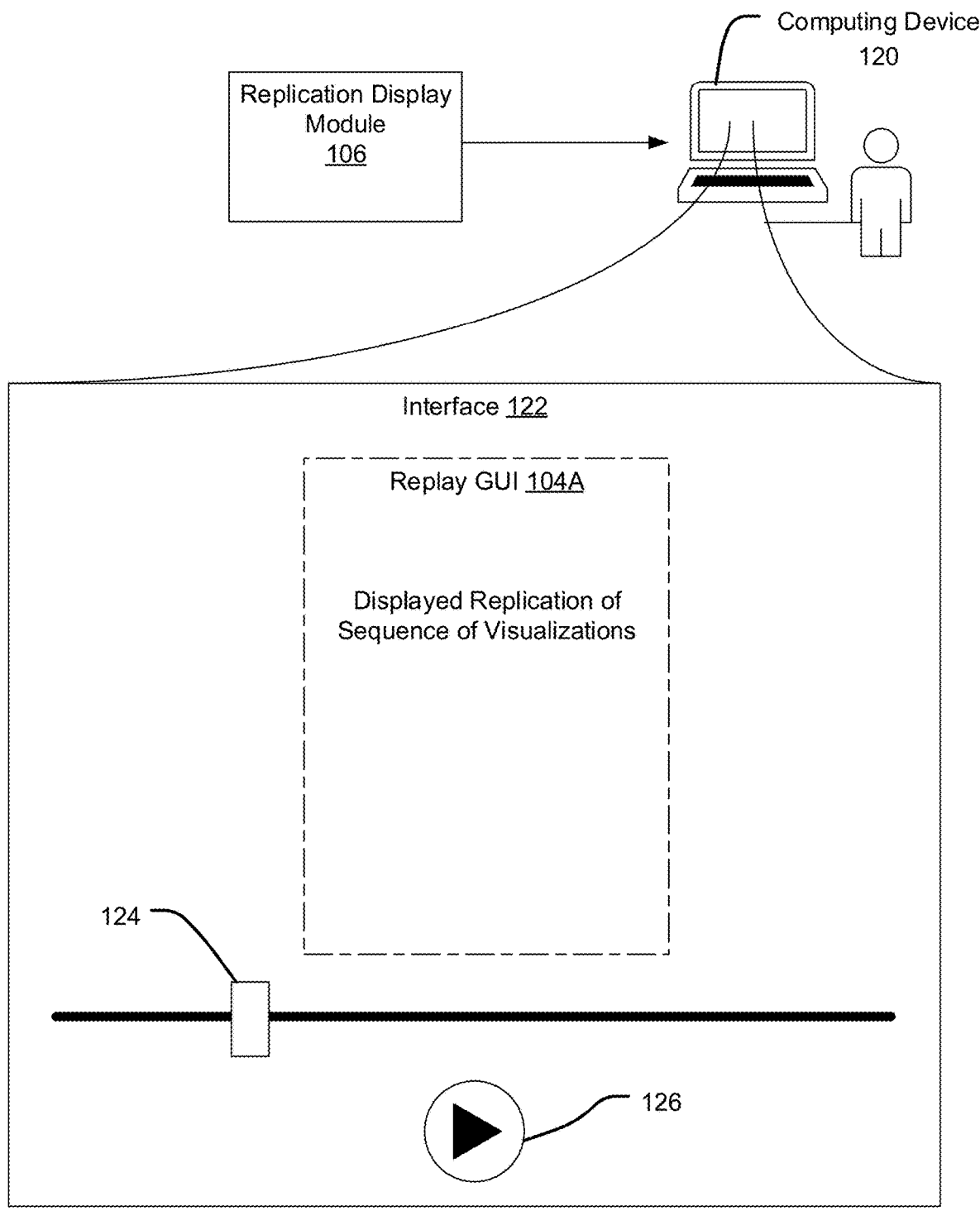
FIG. 1D is a display of a computing device showing a replay GUI, according to some embodiments of the technology described herein.

FIG. 1D is a display of the computing device 120 showing the replay GUI 104A of FIG. 1C, according to some embodiments of the technology described herein. As shown in FIG. 1D, the replication display module 106 of the session replay system 100 may provide an interface 122 displaying the replay GUI 104A in which the sequence of visualizations 112A, 112B, 112C rendered in the application GUI 112 are replicated by the replication module 104.

As shown in FIG. 1D, the interface 122 provided by the replication display module 106 includes a display of the replay GUI 104A of FIG. 1C. The replications 104A-1, 104A-2, 104A-3 of the sequence of visualizations 112A, 112B, 112C rendered in the replay GUI 104A may be viewed through the interface 122. In the example of FIG. 1D, the interface 122 include playback control features that allows a user of the device 120 to control replication in the replay GUI 104A. The interface 122 includes a play/pause button 126 that may be used to play/pause replication. The interface 122 further includes an element 124 that can be used to navigate through a sequence of visualization replications.

In some embodiments, the interface 122 provided by the replication display module 106 may be a GUI shown in a webpage in an Internet website that can be accessed by the computing device 120 using an Internet browser application. In some embodiments, the interface 122 provided by the replication display module 106 may be a GUI of an application installed on the computing device 120. In some embodiments, the operations 104B-1, 104B-2, 104B-3 for replication the visualizations may be executed by server(s) of the session replay system 100, and the replication may be displayed on the device 120 in interface 122. In some embodiments, the operations 104B-1, 104B-2, 104B-3 may be executed by the computing device 120 to display the replications 104A-1, 104A-2, 104A-3 in the replay GUI 104A shown in the interface 122.

Figure 2A:
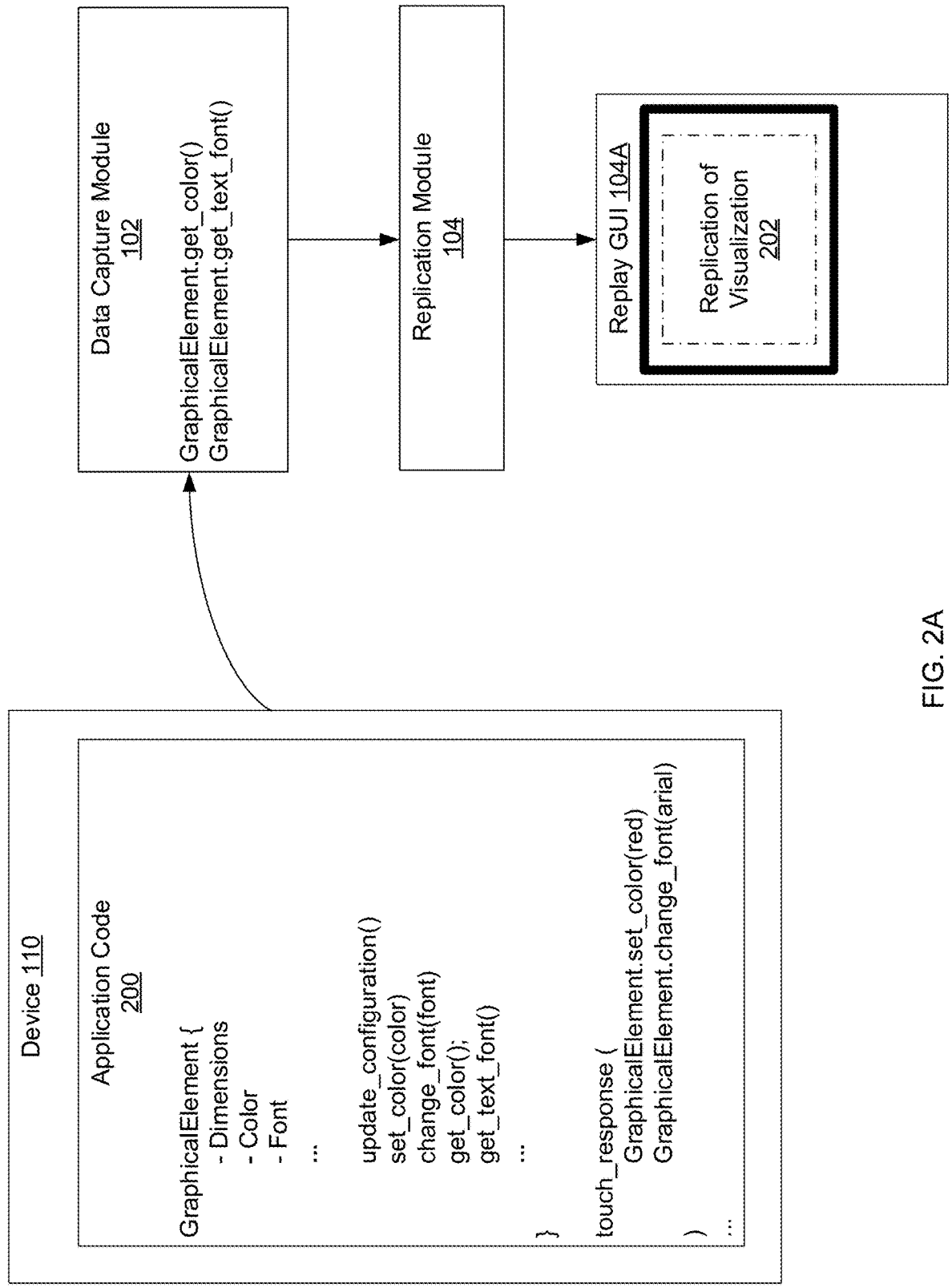
FIG. 2A illustrates an example of capturing data associated with a visualization rendered in a mobile application GUI, according to some embodiments of the technology described herein.

FIG. 2A illustrates an example of capturing data associated with a visualization rendered in a GUI of an application executed by the device 110, according to some embodiments of the technology described herein. For example, the device 110 may be a mobile application and the application may be a mobile application.

FIG. 2A shows application code 200 of the application being executed by the device 110. The application code 200 includes a software object "GraphicalElement" representing a graphical element in the application GUI. For example, the software object may be an instance of a class (e.g., an iOS view or view controller class) representing the graphical element. The software object includes attributes (e.g., properties) that determine appearance of the graphical element and methods for modifying the appearance. For example, the properties include dimensions, color, and font. Property values may be accessed using methods provided by the software object. For example, a "get_color( )" method may be used to access a current color of the graphical element and the "get_text_font( )" method may be used to access a current font of text of the graphical element. The methods include a "set_color(color)" method for changing a color of the graphical element and a "change_font(font)" method for modifying a font of the text of the graphical element.

In the example of FIG. 2A, the application code 200 includes a function "touch_response" that updates a color of the graphical element to red, and changes the text font to the arial font in response to the graphical element being touched in a touch screen (e.g., of a smartphone). The function may be executed in response to detection of a touch interaction with the graphical element. As shown in the example embodiment of FIG. 2A, the data capture module 102 may access data associated with a modification of the graphical element rendered in the application GUI by accessing information from the software object. The data capture module 102 executes methods provided by the software object to obtain information about visual attributes of the graphical element. The data capture module 102 may execute the "get_color( )" and "get_text_font( )" functions provided by the software object to obtain an updated color and textual font of the graphical element. The data indicating the changed color and font obtained from executing these functions may be data associated with the rendered visualization of the change in the graphical element that is obtained by the data capture module 102.

As shown in FIG. 2A, the replication module 104 may use the data associated with the visualization rendered in the application GUI to replicate the visualization in the replay GUI 104A. The replay GUI 202A may be displayed as part of an interface that can be accessed by the device 120 (e.g., as described herein with reference to FIG. 1D).

In some embodiments, the replication module 104 may determine a set of one or more operations that can be executed by the session replay system 100 to replicate updating of the color and font of the graphical element in the application GUI. The replication module 104 may identify a set of operation(s) available in a software library (e.g., Skia) that replicate the visualization from the application GUI. The replication module 104 may then execute the set of operation(s) to generate the replication 202 in the replay GUI 104A.

In some embodiments, instead of obtaining updated visual attributes of the graphical element as illustrated in the example of FIG. 2A, the data capture module 102 may obtain data indicating a set of operations performed by the device 110 to render a visualization. For example, the data capture module 102 may obtain data indicating operation(s) performed in an ANDROID application using an instance of a canvas class. The replication module 104 may be able to access a software construct (e.g., a software class) used to render the visualization (e.g., because the replication module 104 has access to a software library that was also used by the application). The replication module 104 may then replicate the visualization by executing the same operation(s). For example, the replication module 104 may use an instance of the canvas class to execute the same operations and thus replicate the visualization in a replay GUI.

Figure 2B:
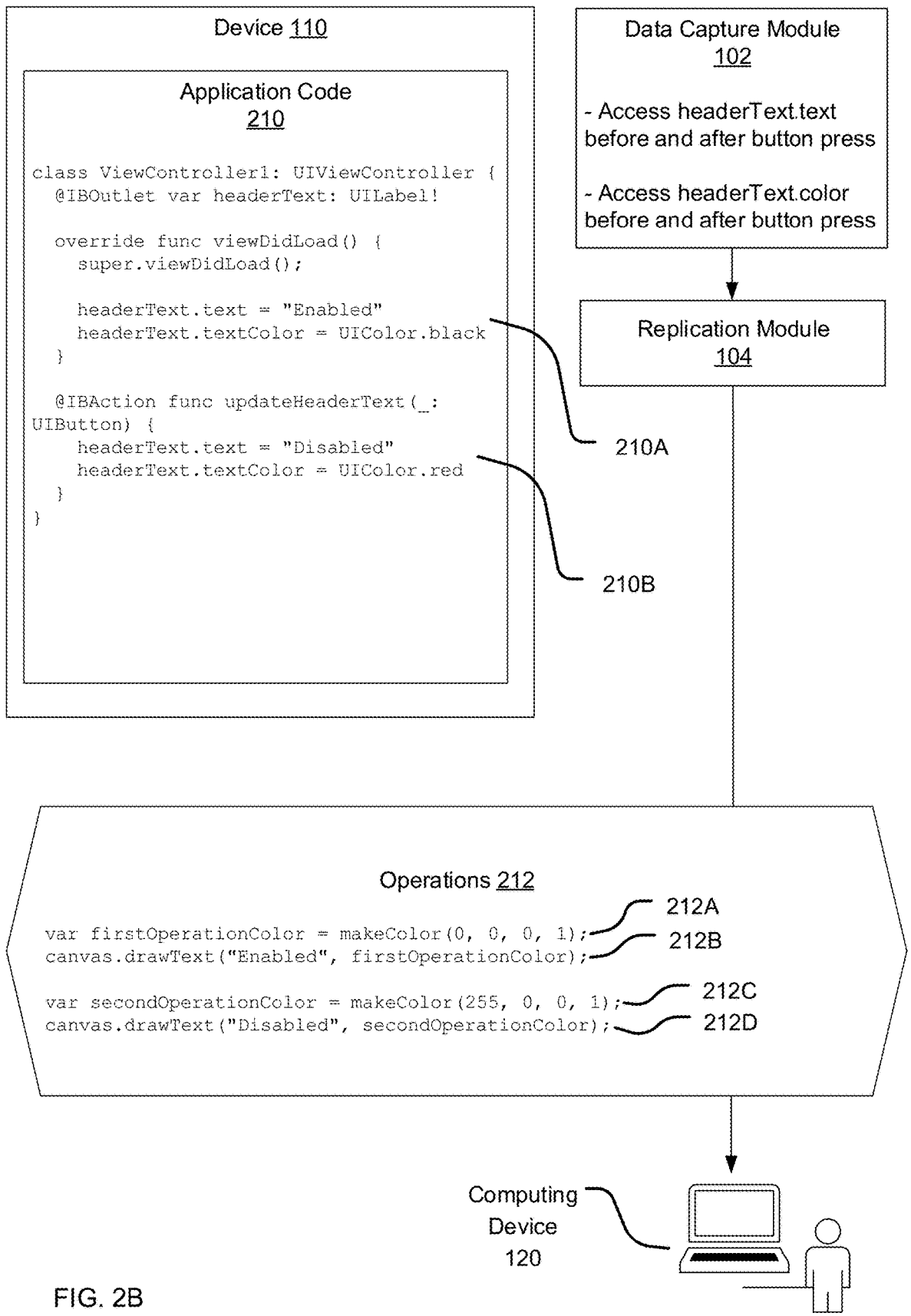
FIG. 2B illustrates an example of capturing data associated with a visualization rendered in a mobile application GUI and a determined set of operations that, when executed, replicate the visualization, according to some embodiments of the technology described herein.

FIG. 2B illustrates an example of capturing data associated with a visualization rendered in a mobile application GUI and a determined set of operations that, when executed, replicate the visualization, according to some embodiments of the technology described herein. For example, the device 110 may be a mobile application and the application may be a mobile application.

In the example of FIG. 2B, the device 110 is using iOS. The application code 210 includes code that utilizes iOS view and view controller classes to render visualizations in a GUI of the application. In this example, the application code 210 includes a section 210A that sets an initial text of a label in the GUI to "Enabled", and the text's color to black. The application code 210 includes a section 210B that specifies a visualization to be rendered in the GUI of the application in response to selection of a button in the GUI. The code in the section 210B causes the label text to change to "Disabled" and the text color to change to red in response to selection of the button in the GUI.

As shown in the example of FIG. 2B, the data capture module 102 may capture data associated with a visualization rendered in the application GUI in response to selection of the button. The data capture module 102 may capture the label's text in the GUI (i.e., "headerText.text") and the text's color (i.e., "headerText.color"). For example, the data capture module 102 may access the data using methods provided by the UILabel class to read values of the "text" and "textColor" properties in the "headerText" instance of the class.

The replication module 104 may use the data captured by the data capture module 102 to determine a set of operations 212 to replicate the visualization rendered in the application GUI of the device 110 in response to selection of the button. The set of operations 212 includes operations 212A, 212B that generate a visualization of the application GUI prior to pushing of the button. The operation 212A defines a black color. Operation 212B sets, in a canvas class representing a replication GUI: (1) text representing the label from the application GUI to "Enabled"; and (2) the color of the text to the black color defined in operation 212A. The set of operations 212 includes operations 212C, 212D that generate a visualization of the application GUI after pushing of the button (i.e. after the label text and color were updated by the device 110). The operation 212C defines a red color. The operation 212D sets, in the canvas class representing the replay GUI: (1) the text representing the label from the application GUI to "Disabled"; and (2) the color of the text to the red color defined in operation 212C.

As shown in FIG. 2B, the operations 212 may be sent to the computing device 120 for execution. When the computing device 120 executes the operations 212, the computing device 212 may replicate, in a replay GUI, the visualization of the change in label text and color from the application GUI. For example, execution of the operations 212 may cause the computing device 212 to render a replicated visualization in the replay GUI.

Figure 3:
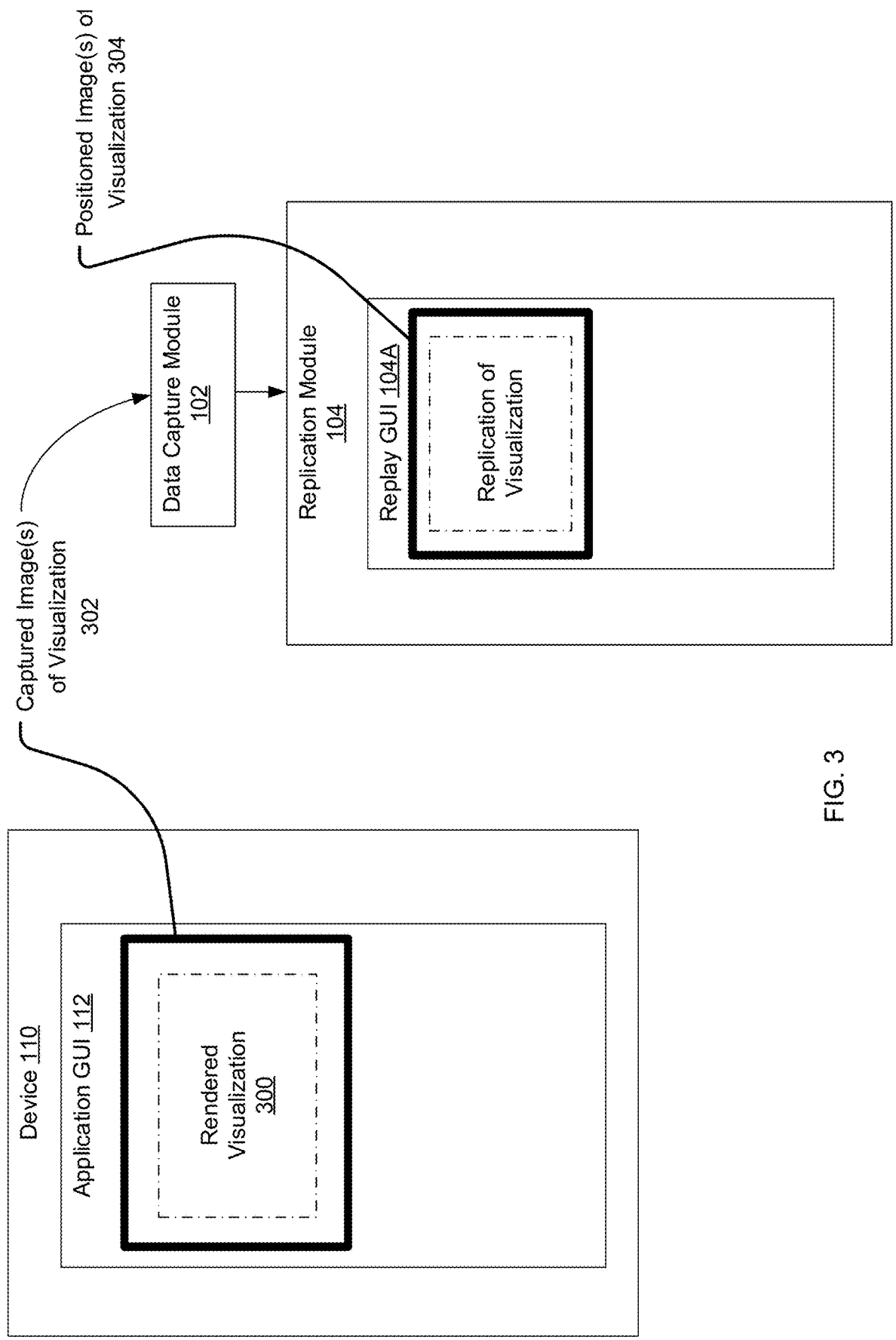
FIG. 3 illustrates an example of capturing an image of a visualization rendered in a mobile application GUI and use of the image in replicating the visualization, according to some embodiments of the technology described herein.

FIG. 3 illustrates an example of capturing image(s) of a visualization rendered in an application GUI 112 by a device 110 and the use of the image(s) in replicating the visualization, according to some embodiments of the technology described herein.

As shown in FIG. 3, the application GUI 112 displays a rendered visualization 300 within the GUI 112. The data capture module 102 captures one or more images 302 of the rendered visualization 300 in the application GUI 112. The data capture module 102 may store the images in the datastore 108 of the session replay system 100. The replication module 104 may use the images to replicate the visualization 300 in the replay GUI 104A. As shown in FIG. 3, the replication module 104 positions the image(s) 304 of the visualization obtained by the data capture module 102 in the replay GUI 104A to provide a replication of the visualization 300 rendered in the application GUI 112 of the device 110.

In some embodiments, the data capture module 102 may capture image(s) of the rendered visualization 300 by: (1) identifying a portion of the application GUI 112 in which the visualization 300 was rendered; and (2) capturing image(s) of the identified portion as the image(s) 304. The data capture module 102 may identify coordinates of a boundary of the portion of the application GUI 112. For example, the data capture module 102 may identify boundaries of a graphical element that was modified as part of the rendered visualization 300. The data capture module 102 may obtain image(s) of the graphical element using the identified boundaries.

In some embodiments, the data capture module 102 may identify a portion of the application GUI 112 in which the visualization 300 is rendered using data obtained from a software object (e.g., an instance of a software class) representing a graphical element of the GUI 112. The software object may include a method that allows the data capture module 102 to access information indicating a location of the graphical element represented by the software object. For example, the software object may include a method providing coordinates of a boundary of the graphical element in the application GUI 112. The data capture module 102 may capture image(s) of a portion of the application GUI 112 enclosed by the boundary. For example, the data capture module 102 may clip to the portion of the application GUI 112. As another example, the software object may include a method that, when executed, returns an image of the graphical element represented by the software object. The data capture module 102 may execute the method to obtain the image(s) 304 of the rendered visualization 300.

Figure 4:
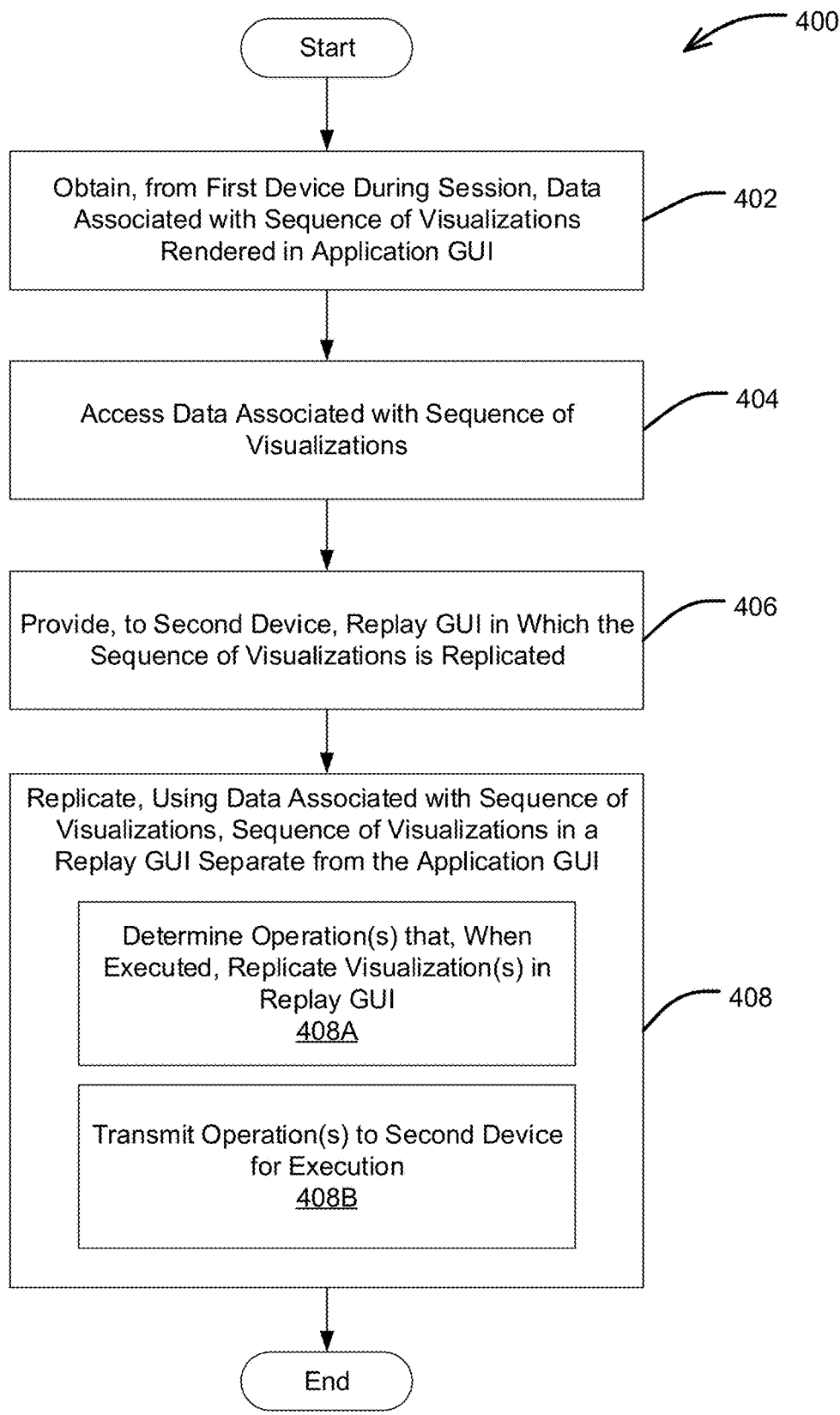
FIG. 4 illustrates an example process of replaying a sequence of visualizations rendered in a GUI of a mobile application executed by a mobile device on a display of a computing device different from the mobile device, according to some embodiments of the technology described herein.

FIG. 4 illustrates an example process 400 of replaying a sequence of visualizations rendered in a GUI of an application executed by a first device on a display of a second device, according to some embodiments of the technology described herein. In some embodiments, process 400 may be performed by session replay system 100 described herein with reference to FIGS. 1A-1D, and FIGS. 2-3. In some embodiments, process 400 may be performed to replay a sequence of visualizations rendered in a mobile application GUI of a mobile device on a display of another computing device. For example, process 400 may be performed to replay a session of the mobile application in which a user was interacting with the mobile application through the mobile application GUI. The first device may thus be a mobile device.

Process 400 begins at block 402, where the system performing process 400 obtains, from the first device (e.g., a mobile device), data associated with a sequence of visualizations rendered in the application GUI (e.g., a mobile application GUI).

In some embodiments, the system may obtain data associated with a visualization rendered in the application GUI by obtaining data indicating visual attribute(s) of a graphical element. The system may obtain the data using a software object (e.g., an instance of a software class) representing the graphical element in the code of the application. For example, the system may use methods provided by the software object to obtain information about visual attributes of the graphical element that are indicative of a change in the appearance of the graphical object (e.g., color, font, dimensions, rotation, and/or other attributes).

In some embodiments, the system may obtain data associated with a visualization rendered in the application GUI by obtaining one or more images of a portion of the application GUI. The system may obtain image(s) of a portion of the application GUI including a graphical element that was modified in the visualization. The system may identify the portion of the application GUI including the graphical element, and then obtain an image of the portion of the application GUI (e.g., by performing a screen clip operation). In some embodiments, the system may identify the portion of the application GUI including the graphical element by accessing an indication (e.g., coordinates) of a boundary of the graphical element from a software object (e.g., an instance of a software class) representing the graphical element. For example, the system may execute a method that returns coordinates defining a boundary of the graphical element in the application GUI.

In some embodiments, the system may obtain data associated with a visualization rendered in the application GUI by obtaining an indication of operation(s) executed by the first device to render the visualization. The system may identify the operations and obtain a record of the operations. For example, the system may detect execution of certain methods (e.g., methods provided by a software object representing a GUI and/or graphical elements therein) and store a record of the methods. The methods may be those that result in rendering a visualization in the application GUI.

In some embodiments, the system may obtain data using different techniques described herein to obtain data associated with different visualizations in the sequence of visualizations rendered in the application GUI. For example, the system may obtain image(s) of a first visualization and obtain data indicating visual attributes of a graphical element for a second visualization. In some embodiments, the system may determine a technique to use based on a visualization. For example, in some embodiments, the system may determine whether it is possible to obtain information from a software object indicating visual attributes of a graphical element updated as part of a visualization. If so, the system may obtain data indicating the visual attributes of the graphical element using a software object representing the graphical element. Otherwise, the system may obtain image(s) of the visualization. As another example, in some embodiments, the system may determine whether it is able to identify a set of operation(s) to replicate a visualization. If the system determines that it can identify such a set of operation(s), the system may obtain data indicating changes in visual attributes of a graphical element and use the data to determine a set of operation(s) (e.g., drawing operations) that can be executed to replicate the visualization. If the system determines that it cannot identify such a set of operation(s), the system may obtain image(s) of the visualization.

In some embodiments, the system may store data associated with a sequence of visualizations rendered in an application GUI in a datastore (e.g., datastore 108 of session replay system 100 described herein with reference to FIGS. 1A-1D). For example, the sequence of visualizations may be visualizations rendered in a session of the software application. The system may store the data in the datastore in a record associated with the session. The data may subsequently be accessed for replaying the session.

Next, process 400 proceeds to block 404, where the system accesses data associated with the sequence of visualizations. The system may access the data stored in a datastore of the system. In some embodiments, the system may access a record associated with a session storing the data associated with the rendered visualizations. The data may represent the session.

Next, process 400 proceeds to block 406, where the system provides, to the second device, a replay GUI. In some embodiments, the system may provide the replay GUI in an interface of an application. For example, the system may provide the replay GUI in a GUI of a webpage of an Internet website that can be accessed by the second device using an Internet browser application. The replay GUI may be provided through a web application. As another example, the system may provide the replay GUI through an interface of an application installed on the second device.

In some embodiments, the system may provide a replay GUI with a control interface to control replication of the sequence of visualizations in the replay GUI. For example, the control interface may be a playback interface with play/pause control, forward/rewind controls, and/or a draggable element to control a position in a sequence of replicated visualizations. A user of the second device may use the control interface to navigate through a replay consisting of a sequence of replications of the visualizations rendered on the first device.

Next, process 400 proceeds to block 408, where the system uses the data associated with the sequence of rendered visualizations, to replicate the sequence of visualizations in a replay GUI separate from the application GUI. The system may generate a new GUI as the replay GUI. In some embodiments, the system may use a software object (e.g., an instance of a software class) representing a screen of the device to generate the replay GUI in a software application separate from the application from which the visualizations are being replayed. For example, the system may use an instance of a canvas software class provided in the Skia software library in a software application to generate the replay GUI. The system may replicate the sequence of rendered visualizations in the replay GUI.

At subblock 408A of block 408, the system determines a set of operation(s) to replicate one or more visualizations. In some embodiments, the system may determine set of drawing operation(s) to replicate the visualization. For example, the set of drawing operation(s) may be a set of drawing operations provided by the canvas software class from the Skia library. Data associated with the visualization may indicate one or more changes in visual attributes of a graphical element that occurred in the visualization. The system may use the data to determine the set of operation(s) (e.g., drawing operations) that, when executed, replicate the change(s) in the visual attributes in the replay GUI. For example, the set of operation(s) may comprise a set of primitive drawing operations that, when executed, result in rendering a replicated visualization in the replay GUI.

In some embodiments, the data associated with a visualization may be image(s) of the visualization. The system may determine a set of operation(s) that place image(s) of visualization(s) in the replay GUI. The operation(s), when executed by the second device, may cause the second device to position the image(s) at locations within a replay GUI determined by the system. The placement of image(s) may result in replicating changes from the application GUI in the replay GUI.

In some embodiments, the data associated with a visualization may be an indication of one or more operations (e.g., drawing operations) performed by the first device to render the visualization. The determined set of operation(s) may include the operation(s) performed by the first device. The system may transmit the operation(s) to the second device for execution. When executed by the second device, the operation(s) cause the second device to render the visualization in the replay GUI. For example, the first device may have used a canvas class instance to execute one or more operations to render a visualization. The data obtained at block 402 may indicate those operation(s). The second device may use a canvas class instance to represent the replay GUI, and execute the same operation(s) to replicate visualization in the replay GUI.

At subblock 408B of block 408, the system transmits the determined operation(s) to the second device for execution. The second device may execute the operation(s) to replicate the visualization(s). For example, an Internet browser application of the second device may execute the operation(s) to render replicated visualization(s) in the replay GUI. In some embodiments, the system may execute the operation(s) using server(s) of the system to replicate the visualization(s) in the replay GUI. For example, the system may execute the operation(s) and display the replay GUI during execution in order to render replicated visualization(s) in the replay GUI.

In some embodiments, the system may use different replication techniques described herein to replicate different ones of the rendered visualizations. For example, the system may position image(s) in a replay GUI to replicate certain visualizations, and determine and execute a set of operation (s) to replicate other visualizations. In some embodiments, when the system can determine and execute a set of operation(s) to replicate a visualization it may do so. Otherwise, the system may place an image of the visualization in the replay GUI. In some embodiments, the system may store categories of visualizations that the system can determine a set of operations to replicate. The system may determine a technique to use in replicating a given visualization based on whether it belongs to a category for which the system can determine a set of operations to replicate. If so, the system may determine a set of operations and execute those operations to replicate the visualization. Otherwise, the system may replicate the visualization by placing image(s) of the visualization in the replay GUI.

Figure 5A:
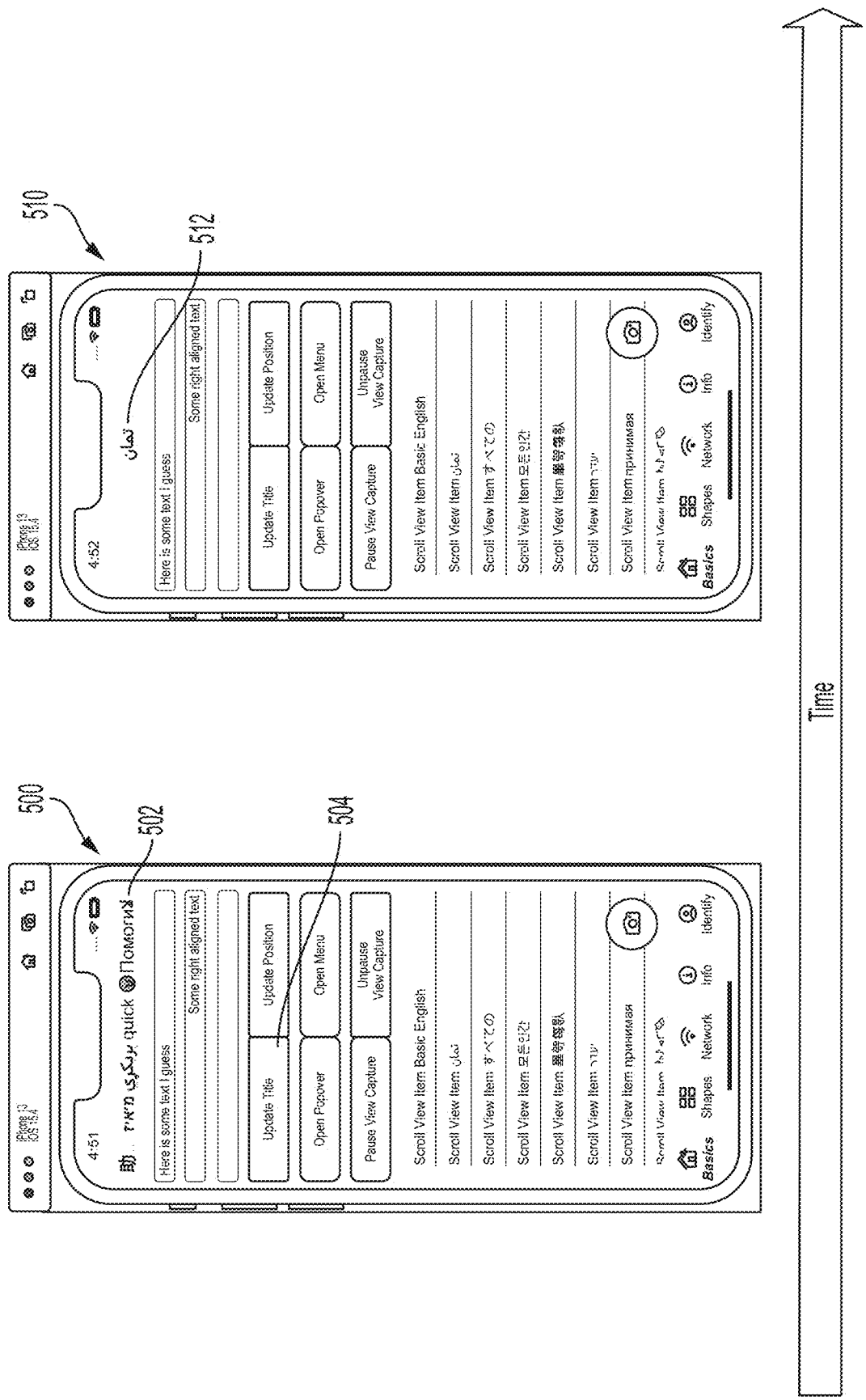
FIG. 5A illustrates a visualization rendered in a mobile application GUI, according to some embodiments of the technology described herein.

FIG. 5A illustrates a visualization rendered in a mobile application GUI 500, according to some embodiments of the technology described herein. As shown in FIG. 5A, the application GUI 500 includes title text 502 and a button 504 for updating the title. Reference number 510 shows the application GUI 500 after an update to the title text 502 in response to selection of the update title button 504 (e.g., by tapping the button 504 on a touch screen) in the GUI 500. Selection of the update title button 504 causes the mobile application to render, in the GUI 500, a visualization comprising of updating the title text 502 to title text 512.

Figure 5B:
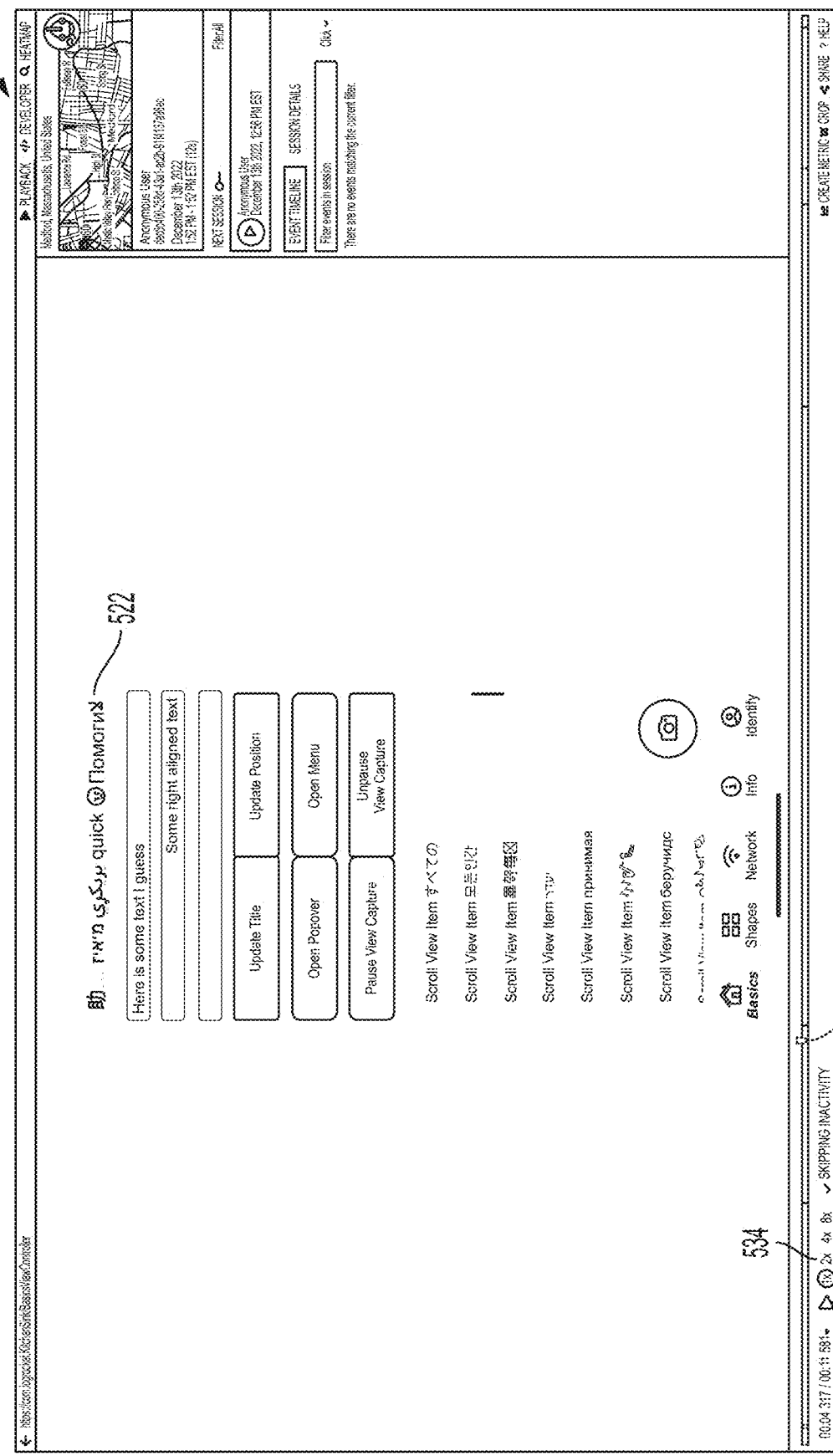
FIGS. 5B-5D illustrate replication of the visualization of FIG. 5A displayed in a GUI of another application, according to some embodiments of the technology described herein.
Figure 5C:
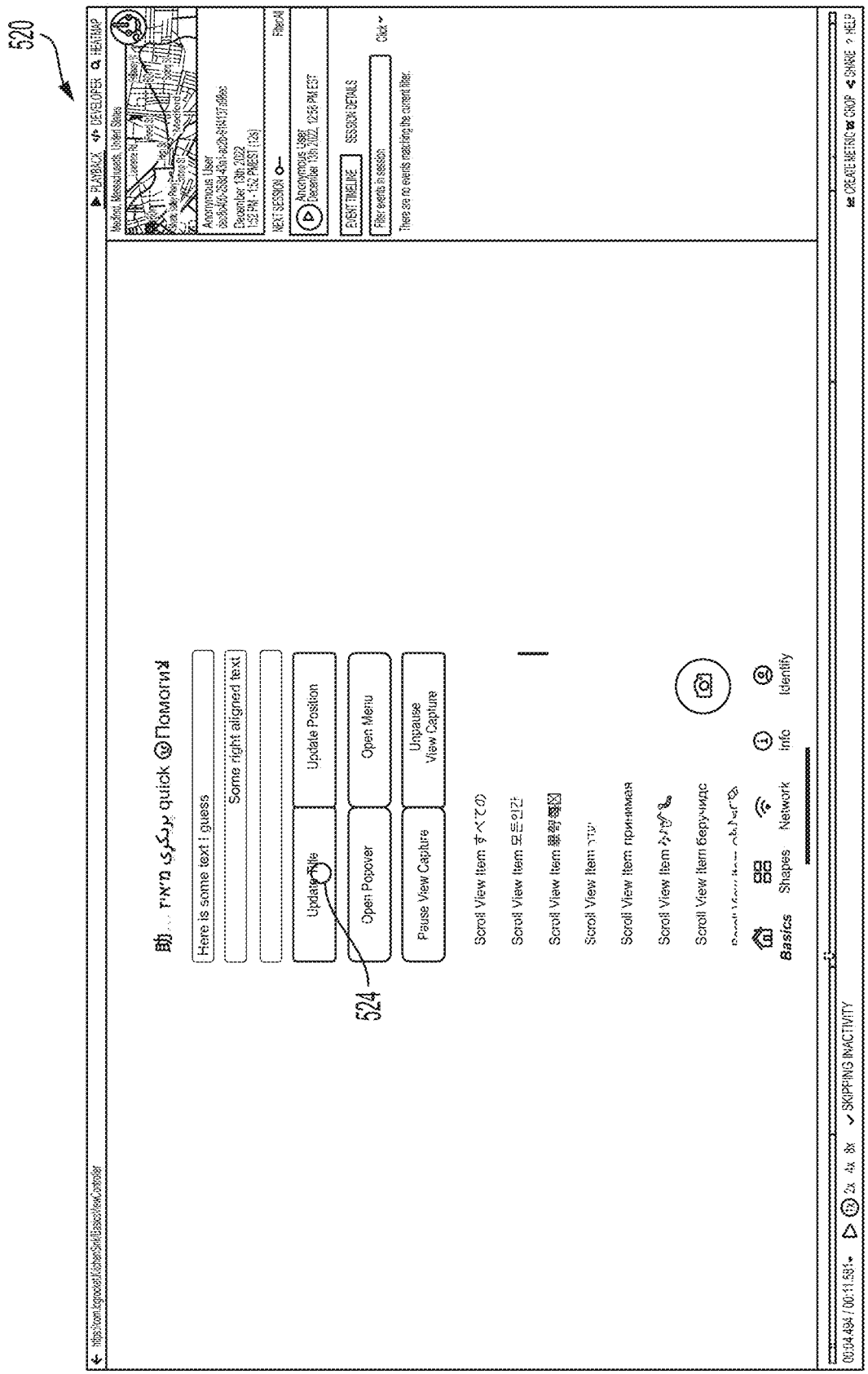

FIGS. 5B-5C illustrates a replay GUI 520 for displaying a replay of the rendered visualization of FIG. 5A, according to some embodiments of the technology described herein. For example, the replay GUI 520 may be one generated by the session replay system 100 described herein with reference to FIGS. 1A-1D. As shown in FIG. 5B, the replay GUI 520 shows a replication of the mobile application GUI 500. In FIG. 5B, the replication of the application GUI 500 includes title text 522, which matches the title text of the application GUI 500 prior to selection of the update title button 504 in the application GUI 500.

As shown in FIG. 5B, the replay GUI 520 includes a playback control interface to control display of a replay of one or more visualizations from an application GUI. The control interface includes a draggable element 528 that can be used by a user to navigate through a replay (e.g., through a sequence of replicated visualizations). The control interface further includes a play/pause button 530 that can be used to resume or stop a replay. The control interface also includes an indication 532 of time within a session being replayed. The control interface further includes options 534 to control a speed at which the replay is displayed. In the example of FIG. 5B, the options 534 include 1× (i.e., no acceleration), 2×, 4×, and 8×.

FIG. 5C shows an indication of a user selection 524 of the update title button 504 in the application GUI 500 of FIG. 5A. In the example of FIG. 5C, the replay GUI 520 indicates selection of the button with a dot to provide a viewer of the replay GUI an indication of a user action performed in the application GUI 500. Although the application GUI 500 may not provide an indication of the button selection, the replay GUI may provide the indication to give the user an indication of an action provided by the user (e.g., touching of the button 504 in the application GUI 500).

Figure 5D:
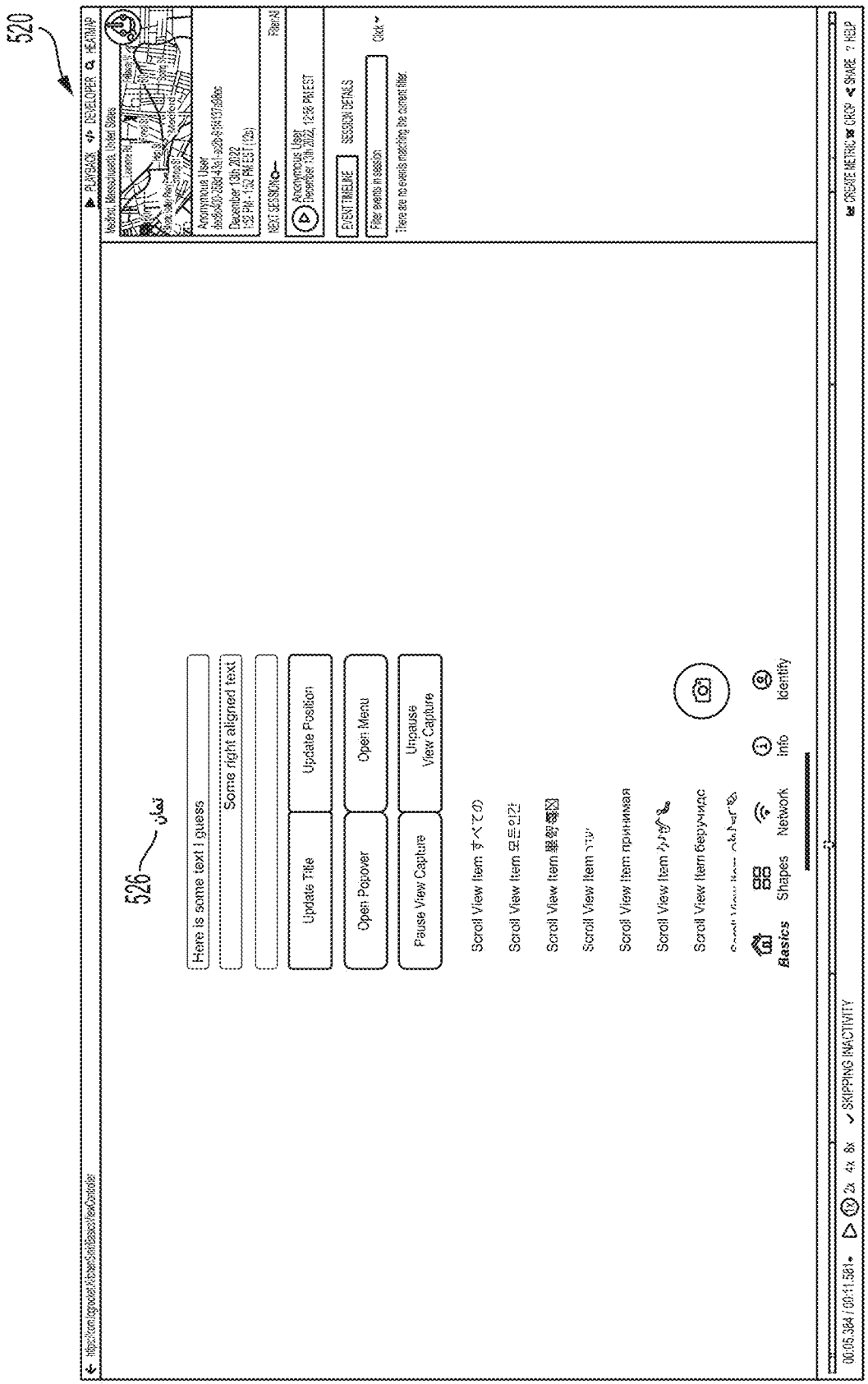

FIG. 5D shows the replay GUI 520 after replicating the visualization from the application GUI 500. The GUI 520 shows an updated title text 526. As shown in FIG. 5D, the replay GUI 520 now shows an updated title 526 like the application GUI 500 after selection of the update title button 504. The update may have been performed using replication techniques described herein. For example, the title may have been update by executing one or more operations determined to replicate the title update rendered in the application GUI 500 (e.g., using data indicating the updated text). As another example, the title may have been updated in the replay GUI 520 by placing an image of the updated title obtained from the mobile application in the replay GUI 520. As another example, the title may have been updated by execution of an operation that was executed by the mobile application.

Figure 6:
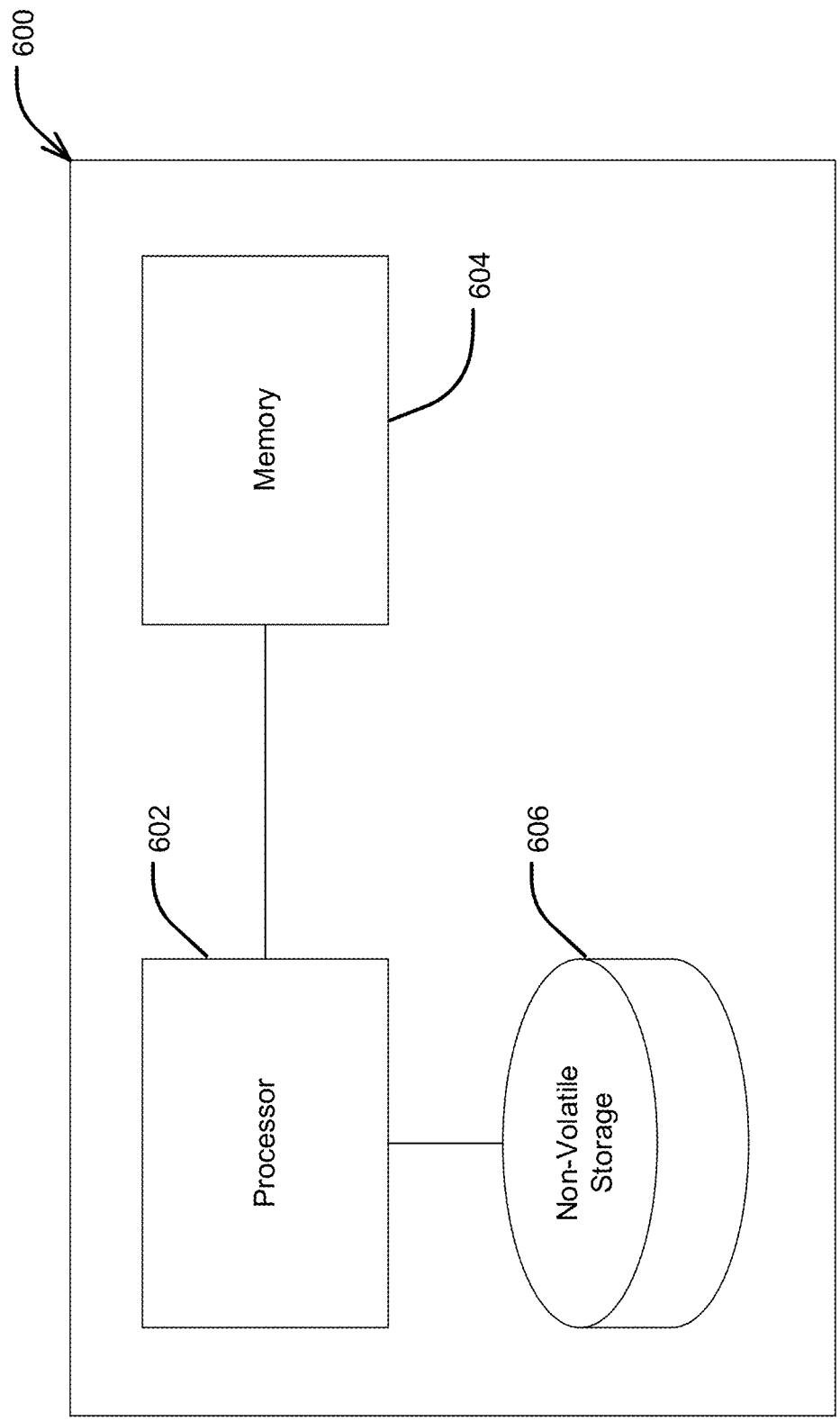
FIG. 6 is a block diagram of an illustrative computing system that may be used in implementing some embodiments of the technology described herein.

FIG. 6 is an example computer system 600 which may be used to implement some embodiments of the technology described herein. The computing system 600 may include one or more computer hardware processors 602 and non-transitory computer-readable storage media (e.g., memory 604 and one or more non-volatile storage devices 606). The processor(s) 602 may control writing data to and reading data from (1) the memory 604; and (2) the non-volatile storage device(s) 606. To perform any of the functionality described herein, the processor(s) 602 may execute one or more processor-executable instructions stored in one or more non-transitory computer-readable storage media (e.g., the memory 604), which may serve as non-transitory computer-readable storage media storing processor-executable instructions for execution by the processor(s) 602.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIG. 6. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user." It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of replaying a sequence of visualizations rendered in a graphical user interface (GUI) of a mobile application executed by a mobile device on a display of a computing device different from the mobile device, the method comprising:
using a processor to perform:
accessing data associated with the sequence of visualizations obtained from the mobile device during a session in which the sequence of visualizations was being rendered in the mobile application GUI;
providing, to the computing device different from the mobile device, a replay GUI separate from the mobile application GUI; and
replicating, using the data associated with the sequence of visualizations, the sequence of visualizations in the replay GUI to provide a replay of the sequence of visualizations rendered in the mobile application GUI, the replicating comprising:
determining, using data associated with at least one visualization of the sequence of visualizations, a set of drawing operations that, when executed by the computing device different from the mobile device, causes the computing device to replicate the at least one visualization in the replay GUI, wherein:
the set of drawing operations are determined based on a set of software constructs used by the computing device; and
the set of software constructs may be different than a second set of software constructs used by the mobile device to render the sequence of visualizations; and transmitting, to the computing device different from the mobile device, the set of drawing operations for execution by the computing device to replicate the sequence of visualizations in the replay GUI.

2. The method of claim 1, wherein determining, using the data associated with the at least one visualization, the set of drawing operations that, when executed by the computing device different from the mobile device, causes the computing device to replicate the at least one visualization in the replay GUI comprises:
identifying the set of drawing operations from among a plurality of operations provided by an application program object representing a screen of the mobile device.

3. The method of claim 1, wherein:
the sequence of visualizations is rendered in the mobile application GUI by the mobile device using a first operating system; and
the determined set of drawing operations is executable without use of the first operating system.

4. The method of claim 3, wherein the first operating system is an iPhone Operating System (iOS).

5. The method of claim 1, wherein determining, using the data associated with the at least one visualization, the set of drawing operations that, when executed by the computing device different from the mobile device, causes the computing device to replicate the at least one visualization in the replay GUI comprises:
determining, using the data associated with the at least one visualization, a change in a graphical element in the mobile application GUI that occurred as part of the at least one visualization; and
determining the set of drawing operations to replicate, in the replay GUI, the change in the graphical element in the mobile application GUI that occurred as part of the at least one visualization.

6. The method of claim 5, wherein:
the data associated with the at least one visualization comprises data obtained using a software object in code of the mobile application, the software object representing the graphical element in the mobile application GUI.

7. The method of claim 6, wherein the data obtained using the software object in the code of the mobile application comprises data indicating a modification in one or more visual attributes of the graphical element represented by the software object.

8. The method of claim 7, wherein the software object is an instance of a software code class.

9. The method of claim 8, wherein the software code class is an iPhone Operating System (iOS) view class.

10. The method of claim 1, wherein:
the data associated with the sequence of visualizations comprises at least one image of a first one of the sequence of visualizations rendered in the mobile application GUI; and
replicating the sequence of visualizations in the replay GUI comprises:
determining one or more operations that, when executed by the computing device different from the mobile device, cause the computing device to place the at least one image in the replay GUI to replicate the first visualization in the replay GUI; and
transmitting, to the computing device different from the mobile device, the one or more operations.

11. The method of claim 10, wherein determining the one or more operations that, when executed by the computing device different from the mobile device, cause the computing device to place the at least one image in the replay GUI to replicate the first visualization in the replay GUI comprises:
determining a location of the at least one image relative to a reference location in the mobile application GUI; and
determining a location of the at least one image in the replay GUI based on the location of the at least one image relative to the reference location in the mobile application GUI;
wherein the one or more operations, when executed by the computing device different from the mobile device, cause the computing device to place the at least one image at the determined location in the replay GUI.

12. The method of claim 1, wherein data associated with a first one of the sequence of visualizations comprises a location in a screen of the mobile device at which the user touched the screen, and the method further comprises:
determining a location in the replay GUI corresponding to the location in the screen of the mobile device at which the user touched the screen;
wherein replicating the first visualization in the replay GUI comprises:
determining one or more operations that, when executed by the computing device different from the mobile device, cause the computing device to render a visualization indicating a screen touch at a location in the replay GUI corresponding to the location in the screen of the mobile device at which the user touched the screen; and
transmitting, to the computing device different from the mobile device, the one or more operations for execution by the computing device to replicate the visualization indicating the screen touch at the location in the replay GUI corresponding to the location in the screen of the mobile device at which the user touched the screen.

13. The method of claim 1, further comprising:
obtaining, from the mobile device during the session, the data associated with the sequence of visualizations; and
storing the data associated with the sequence of visualizations in a datastore.

14. The method of claim 1, wherein providing, to the computing device different from the mobile device, the replay GUI comprises:
displaying the replay GUI in a webpage of an Internet website accessed by the computing device using an Internet browser application.

15. A system for replaying a sequence of visualizations rendered in a graphical user interface (GUI) of a mobile application executed by a mobile device on a display of a computing device different from the mobile device, the system comprising:
a processor; and
a non-transitory computer-readable storage medium storing instructions that, when executed by the processor, cause the processor to:
access data associated with the sequence of visualizations obtained from the mobile device during a session in which the sequence of visualizations was being rendered in the mobile application GUI;
provide, to the computing device different from the mobile device, a replay GUI separate from the mobile application GUI; and
replicate, using the data associated with the sequence of visualizations, the sequence of visualizations in the replay GUI to provide a replay of the sequence of visualizations rendered in the mobile application GUI, the replicating comprising:

determining, using data associated with at least one visualization of the sequence of visualizations, a set of drawing operations that, when executed by the computing device different from the mobile device, causes the computing device to replicate the at least one visualization in the replay GUI, wherein:

the set of drawing operations are determined based on a set of software constructs used by the computing device; and the set of software constructs may be different than a second set of software constructs used by the mobile device to render the sequence of visualizations; and transmitting, to the computing device different from the mobile device, the set of drawing operations for execution by the computing device to replicate the sequence of visualizations in the replay GUI.

16. The system of claim 15, wherein:

the sequence of visualizations is rendered in the mobile application GUI by the mobile device using a first operating system; and the determined set of drawing operations is executable without use of the first operating system.

17. The system of claim 15, wherein determining, using the data associated with the at least one visualization, the set of drawing operations that, when executed by the computing device different from the mobile device, causes the computing device to replicate the at least one visualization in the replay GUI comprises:

determining, using the data associated with the at least one visualization, a change in a graphical element in the mobile application GUI that occurred as part of the at least one visualization; and determining the set of drawing operations to replicate the change in the graphical element in the replay GUI.

18. The system of claim 17, wherein:

the data associated with the at least one visualization comprises data obtained using a software object in code of the mobile application, the software object representing the graphical element in the mobile application GUI.

19. The system of claim 18, wherein the data obtained using the software object in the code of the mobile application comprises data indicating a modification in one or more visual attributes of the graphical element represented by the software object.

20. A non-transitory computer-readable storage medium storing instructions that, when executed by a processor, cause the processor to perform a method of replaying a sequence of visualizations rendered in a graphical user interface (GUI) of a mobile application executed by a mobile device on a display of a computing device different from the mobile device, the method comprising:

accessing data associated with the sequence of visualizations obtained from the mobile device during a session in which the sequence of visualizations was being rendered in the mobile application GUI;

providing, to the computing device different from the mobile device, a replay GUI separate from the mobile application GUI; and replicating, using the data associated with the sequence of visualizations, the sequence of visualizations in the replay GUI to provide a replay of the sequence of visualizations rendered in the mobile application GUI, the replicating comprising:

determining, using data associated with at least one visualization of the sequence of visualizations, a set of drawing operations that, when executed by the computing device different from the mobile device, causes the computing device to replicate the at least one visualization in the replay GUI, wherein:

the set of drawing operations are determined based on a set of software constructs used by the computing device; and the set of software constructs may be different than a second set of software constructs used by the mobile device to render the sequence of visualizations; and transmitting, to the computing device different from the mobile device, the set of drawing operations for execution by the computing device to replicate the sequence of visualizations in the replay GUI.

* * * * *